US010628321B2

(12) United States Patent
Torchalski et al.

(10) Patent No.: US 10,628,321 B2
(45) Date of Patent: Apr. 21, 2020

(54) PROGRESSIVE FLUSH OF CACHE MEMORY

(71) Applicant: QUALCOMM Incorporated, San Diego, CA (US)

(72) Inventors: Andrew Torchalski, Longmont, CO (US); Edwin Jose, San Diego, CA (US); Joshua Stubbs, Longmont, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/908,637

(22) Filed: Feb. 28, 2018

(65) Prior Publication Data
US 2019/0266098 A1 Aug. 29, 2019

(51) Int. Cl.
*G06F 12/00* (2006.01)
*G06F 12/0891* (2016.01)
*G06F 3/06* (2006.01)

(52) U.S. Cl.
CPC ........ *G06F 12/0891* (2013.01); *G06F 3/0608* (2013.01); *G06F 3/0656* (2013.01); *G06F 3/0659* (2013.01); *G06F 3/0673* (2013.01); *G06F 2212/1044* (2013.01)

(58) Field of Classification Search
None
See application file for complete search history.

(56) References Cited

U.S. PATENT DOCUMENTS

| 6,658,532 | B1 * | 12/2003 | Horrigan ............. G06F 12/0804 711/135 |
| 9,021,209 | B2 | 4/2015 | Branover et al. |
| 9,128,857 | B2 | 9/2015 | Lilly et al. |
| 9,183,144 | B2 | 11/2015 | Wang et al. |
| 2012/0216073 | A1 * | 8/2012 | Douros ................... G06F 9/485 714/19 |
| 2016/0077575 | A1 | 3/2016 | Paul et al. |
| 2016/0092363 | A1 | 3/2016 | Wang et al. |

* cited by examiner

*Primary Examiner* — David Yi
*Assistant Examiner* — Craig S Goldschmidt
(74) *Attorney, Agent, or Firm* — The Marbury Law Group

(57) ABSTRACT

Various embodiments include methods and devices for implementing progressive flush of a cache memory of a computing device. Various embodiments may include determining an activity state of a region of the cache memory, issuing a start cache memory flush command in response to determining that the activity state of the region is idle, flushing the region in response to the start cache memory flush command, determining that the activity state of the region is active, issuing an abort cache memory flush command in response to determining that the activity state of the region is active, and aborting flushing the region in response to the abort cache memory flush command.

26 Claims, 12 Drawing Sheets

US 10,628,321 B2

PROGRESSIVE FLUSH OF CACHE MEMORY

BACKGROUND

Cache memory is volatile memory and requires power to retain data stored in the memory. The more data that is stored in a cache memory, the more power drawn by the cache memory. To conserver power, portions of the cache memory not occupied by active data, or storing data no longer needing to be cached, can be powered off, while only portions of the memory storing data that needs to be cached remain powered.

To enable powering down portions of a cache memory, the inactive or no longer needed data stored in cache must be "flushed" to store that data in another memory to prevent the data from being lost when a portion of the cache memory is powered off. Scheduling and implementing a full flush of the cache memory poses challenges because a cache memory flush should not occur if memory buses are being used, and a full cache memory flush can take longer than the duration of a gap in memory bus usage. If a full cache memory flush is scheduled when other operations will need to access the memory bus, the result will be increased latency in accessing the cache memory. To avoid increasing latency, a full cache memory flush cannot be scheduled until it is known that there is time for completing a cache memory flush from beginning to end before the memory bus will be needed again. When operations are accessing the cache memory frequently, this scheduling requirement may result in cache memory flushes occurring infrequently, which can increase the power drawn by the cache memory as the memory fills up with data that is no longer required to be cached.

SUMMARY

Various disclosed embodiments may include apparatuses and methods for conducting a progressive flush of a cache memory of a computing device. Various embodiments may include determining an activity state of a region of the cache memory, issuing a start cache memory flush command in response to determining that the activity state of the region is idle, flushing the region in response to the start cache memory flush command, determining whether the activity state of the region is or is about to be active, issuing an abort cache memory flush command in response to determining that the activity state of the region is or is about to be active, and aborting flushing the region in response to the abort cache memory flush command.

Some embodiments may further include receiving an indicator of an activity state of a client associated with the region, in which determining an activity state of a region of the cache memory may include determining the activity state of the region based on the activity state of the client.

Some embodiments may further include receiving an indicator of an expected activity state of a client associated with the region including at least one of a time for a transition to the activity state of the client and a duration for the activity state of the client, in which determining an activity state of a region of the cache memory may include determining the activity state of the region based on the expected activity state of the client.

Some embodiments may further include selecting a plurality of sections of the region to flush based on an expected time for flushing the plurality of sections being approximately the same as the duration for the activity state, in which flushing the region may include flushing the plurality of sections sequentially.

Some embodiments may further include determining a flushability status of a section of the region, in which flushing the region may include flushing the section based on the flushability status of the section.

Some embodiments may further include determining an order for flushing a plurality of sections of the region based on an amount of power saved by powering down each of the plurality of sections, in which flushing the region may include flushing the plurality of sections according to the order for flushing the plurality of sections.

Some embodiments may further include determining an order for flushing a plurality of sections of the region based on a degree of dirtiness of data stored at each of the plurality of sections, in which flushing the region may include flushing the plurality of sections according to the order for flushing the plurality of sections.

In some embodiments, aborting flushing the region may include continuing flushing a section of the region that is undergoing flush, and aborting flushing the region in response to completing flushing the section.

Various embodiments may further include a computing device having a cache memory and a processing device configured to perform operations of any of the methods summarized above. Various embodiments may further include a computing device having means for performing functions of any of the methods summarized above. Various embodiments may further include a non-transitory processor-readable medium on which are stored processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
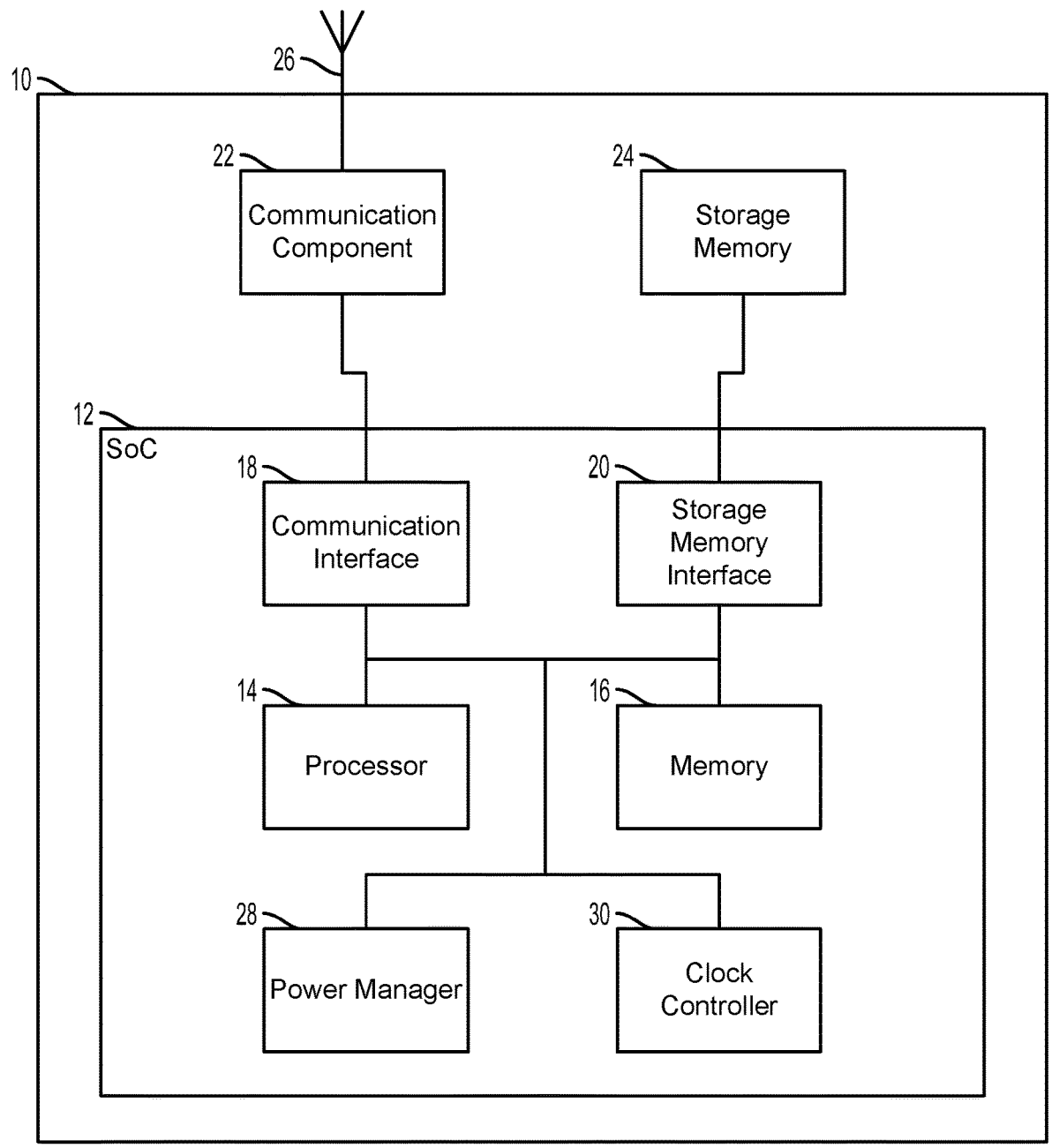
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and computing devices implementing such methods for flushing a region of a cache memory by flushing sections of the region incrementally during multiple idle periods for the region that may be too brief to accomplish a flush the whole region. Some embodiments may include flushing a region of a cache memory initiated for an idle period for the region and aborting the flush in response to a signal sent when use of the region by a client (e.g., a processor, system, or application) is expected or initiated. Some embodiments may include selecting sections and/or regions of the cache memory to be flushed based on an immediate or expected idle period, and/or various algorithms, heuristics and techniques. Some embodiments may include selecting sections and/or regions of the cache memory for flushing based on a flushable status of the data stored in the section/region indicated by the client.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

A hardware power manager may be configured to receive activity state notifications from any number of clients that identify any number of regions of the cache memory that a client expects to be idle (i.e., during which no read or write operation is expected). Such notification may include when and/or how long an identified region will be idle. The client may also indicate and/or mark the region with a flushability status, such as flushable or not flushable, based on the client's expected usage of the data stored on the region. The power manager may be configured to monitor the client's activity state notifications and/or flushability status for the region of the cache memory. The power manager may be configured to send a start cache memory flush command to a cache memory flush controller to instruct the cache memory flush controller to begin a flush of the cache memory. The start cache memory flush command may indicate the region of the cache memory to flush. The region of the cache memory may be any amount of the cache memory, such any number of cache lines or blocks, cache sets, cache ways, and/or cache banks. The start cache memory flush command may also trigger flushing for the entire cache memory.

In response to receiving the start cache memory flush command, the cache memory flush controller may start a cache memory flush process for the cache memory. The cache memory flush process may target regions of the cache memory selected randomly or selected according to various algorithms, heuristics, and/or techniques, and/or specified by the power manager. The cache memory flush controller may prioritize sections of the region to determine an order in which to flush the sections. The sections may be prioritized based on when the sections can be powered down after flushing, the amount of power that can be saved when powered down (i.e., flush the most power-hungry sections first), and/or by how dirty the data is in the sections (i.e., flush cleanest sections first). In other words, the more power a section requires to maintain the data stored in the section and/or the cleaner the data is in the region, the higher the priority that may be assigned to the section. The cache memory flush controller may then order flushing of sections from highest priority sections to lowest priority sections.

Clients executing in the computing device processor may send the power manager activity state notifications identifying regions of the cache memory that each client expects to be active, including a time when activity is expected. The power manager may also monitor for indications of whether a cache memory flush is complete, such as by monitoring activity of the cache memory flush controller, regions of the cache memory, a memory bus for the cache memory, and/or another memory (e.g., lower level cache memory, random access memory, nonvolatile storage memory) to which data of a region is flushed. If the power manager determines that it is nearly time for a client to become active in the region of cache memory and an on-going cache memory flush is not complete, the power manager may generate and send an abort cache memory flush command to the cache memory flush controller.

In response to receiving the abort cache memory flush command, the cache memory flush controller may determine whether flushing of a current section of the region of the cache memory is complete. In response to determining that flushing of the current section is not complete, the cache memory flush controller may complete the flush of that current section. In response to completing the flush of the current section, and/or in response to determining that the flush of the current section is complete, the cache memory flush controller may abort the flush of the region, even when the flush for the whole region is not complete. In other words, in response to receiving the abort cache memory flush command, the cache memory flush controller may finish a current section flush but abort the flush for the rest of the region of cache memory.

In this manner, the power manager and the cache memory flush controller may repeatedly start and abort cache memory flushes of the region as idle periods occur, incrementally flushing sections of the region that may not already be flushed until the cache memory flush for the whole region (i.e., all of the sections of the region) is complete.

The cache memory can transition to lower power states as more sections and/or regions are flushed because less power will be needed to retain the data remaining in the cache memory. For example, the cache memory may power collapse (or transition to an off or no power state) a region in response to completing the cache memory flush of the region. Also, the cache memory may transition the region to a lower power retention state in response to an incomplete or an aborted cache memory flush of the region.

Progressive flushing of a cache memory, facilitated by being able to abort a flush of a region of the cache memory, allows incremental flushing of regions of the cache memory rather than having to wait for an idle period long enough to flush an entire cache memory. The incremental flushing of the cache memory can reduce the power used by the cache memory by reducing the number of regions of the cache memory that need to be powered instead of powering the full cache memory even while retaining obsolete or unneeded data. The incremental flushing of the cache memory may reduce the latency that a client experiences when accessing a cache memory that is being flushed by aborting the flush to enable access to the cache instead of forcing the client to wait until the entire cache is flushed before obtaining access to the cache.

Detection of progressive flushing of a cache memory may be determined by the cache maintenance activity of a computing device. Progressive flushing of a cache memory may be indicated by the frequency and length of cache memory flush maintenance activities. Generally, progressive flushing of a cache memory will exhibit more frequent and shorter duration cache memory flushes than implemented in conventional cache memory maintenance routines. Monitoring the amount of data written back to another memory during cache memory flush operations may also be used to detect progressive flushing of a cache memory. The amount of data written back to another memory will likely be smaller per cache memory flush during progressive flushing of a cache memory than the amount of data written back to another memory during conventional cache memory flush operations because smaller regions of the cache are flushed than by current cache memory flush operations. Monitoring the changes in the power usage of a cache memory following cache memory flush operations may also be used to detect progressive flushing of a cache memory. Power usage by a cache memory will likely decrease by smaller amounts per cache memory flush for progressive flushing of a cache memory than the amount of power usage decrease for conventional cache memory flush operations because smaller regions of the cache are flushed and can be powered down than by current cache memory flush operations.

FIG. 1 illustrates a system including a computing device 10 suitable for use with various embodiments. The computing device 10 may include a system-on-chip (SoC) 12 with a processor 14, a memory 16, a communication interface 18, a storage memory interface 20, a power manager 28, and a clock controller 30. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory 16.

Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

A power manager 28 may be configured to control the distribution and amount of power to any of the components of the computing device 10, including the processor 14, the memory 16, the communication interface 18, the storage memory interface 20, the clock controller 30, the communication component 22, the storage memory 24, and the antenna 26. The power manager 28 may be configured to control a power state of any of the components of the computing device 10 and the computing device 10 itself. In some embodiments, the power manager 28 may be implemented as a separate circuit component on the SoC 12, such as a special purpose circuit, a dedicated processor configured with firmware and/or software, or a combination of dedicated circuitry and a dedicated processor configured with firmware and/or software.

The clock controller 30 may be configured to control the clock mode, such as an oscillating frequency of a crystal oscillator and/or gate signal, provided to the resource components of the computing device 10, such as the processor 14, the communication interface 18, the storage memory interface 20, the power manager 28, and the communication component 22. The clock controller 30 may be configured to provide the components of the computing device 10 with an oscillating signal configured to coordinate executions by circuits of the components of the computing device 10. In some embodiments, the clock controller 30 may be implemented as a separate circuit component on the SoC 12, such as a special purpose circuit, a dedicated processor configured with firmware and/or software, or a combination of dedicated circuitry and a dedicated processor configured with firmware and/or software.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
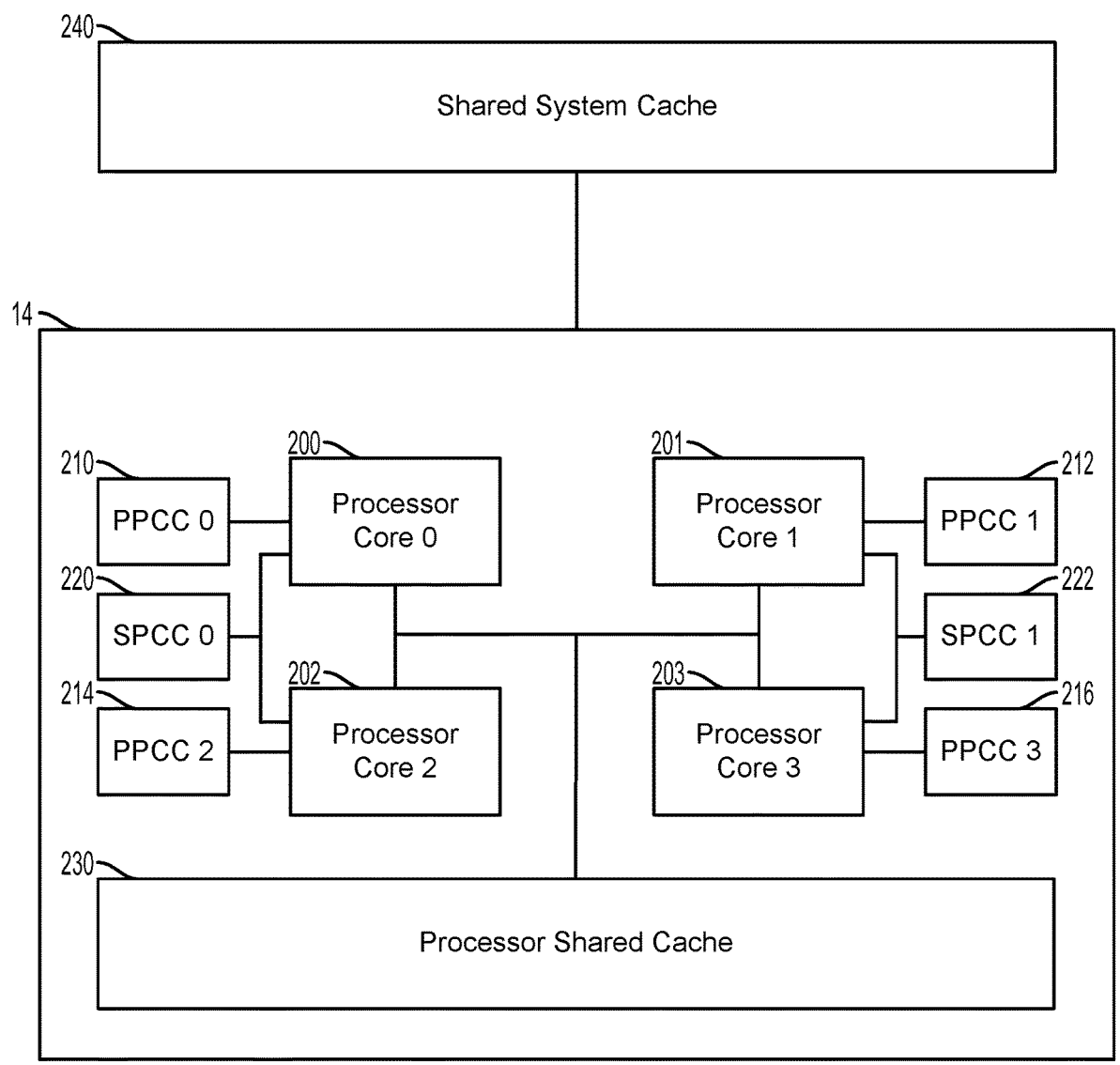
FIG. 2 is a component block diagram illustrating an example multicore processor suitable for implementing various embodiments.

FIG. 2 illustrates components of a computing device suitable for implementing an embodiment. The processor 14 may include multiple processor types, including, for example, a CPU and various hardware accelerators, such as a GPU, a DSP, an APU, subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. The processor 14 may be a GPU or a DSP, and the processor cores 200, 201, 202, 203 may be homogeneous graphics processor cores or digital signal processor cores, respectively. The processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 12 of FIG. 1) may include any number of homogeneous or heterogeneous processors 14. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203. The private processor core cache 210, 212, 214, 216 may include volatile memory as described herein with reference to memory 16 of FIG. 1.

Groups of the processor cores 200, 201, 202, 203 of a processor 14 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated, for use in execution by the processor cores 200, 201, 202, 203 in the designated group. The shared processor core cache 220, 222 may include volatile memory as described herein with reference to memory 16 of FIG. 1.

The processor 14 may include a shared processor cache memory 230 that may be dedicated for read and/or write access by the processor cores 200, 201, 202, 203 of the processor 14. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 14. The shared cache 230 may include volatile memory as described herein with reference to memory 16 (FIG. 1).

Multiple processors 14 may access a shared system cache memory 240 that may be dedicated for read and/or write access by the processor cores 200, 201, 202, 203 of the multiple processors 14. The shared system cache 240 may store data and/or instructions, and make the stored data and/or instructions available to the processor cores 200, 201, 202, 203, for use in execution by the processor cores 200, 201, 202, 203. The shared system cache 240 may also function as a buffer for data and/or instructions input to and/or output from the multiple processors 14. The shared system cache 240 may include volatile memory as described herein with reference to memory 16 illustrated in FIG. 1.

In the example illustrated in FIG. 2, the processor 14 includes four processor cores 200, 201, 202, 203 (i.e., processor core 0, processor core 1, processor core 2, and processor core 3). In the example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1). For ease of explanation, the examples herein may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The computing device 10, the SoC 12, or the processor 14 may individually or in combination include fewer or more than the four processor cores 200, 201, 202, 203 and private processor core caches 210, 212, 214, 216, and two shared processor core caches 220, 222 illustrated and described herein.

In various embodiments, a processor core 200, 201, 202, 203 may access data and/or instructions stored in the shared processor core cache 220, 222, the shared processor cache 230, and/or the shared system cache 240 indirectly through access to data and/or instructions loaded to a higher level cache memory from a lower level cache memory. For example, levels of the various cache memories 210, 212, 214, 216, 220, 222, 230, 240 in descending order from highest level cache memory to lowest level cache memory may be the private processor core cache 210, 212, 214, 216, the shared processor core cache 220, 222, the shared processor cache 230, and the shared system cache 240. In various embodiments, data and/or instructions may be loaded to a cache memory 210, 212, 214, 216, 220, 222, 230, 240 from a lower level cache memory and/or other memory (e.g., memory 16, 24 illustrated in FIG. 1) as a response to a miss the cache memory 210, 212, 214, 216, 220, 222, 230, 240 for a memory access request, and/or as a response to a prefetch operation speculatively retrieving data and/or instructions for future use by the processor core 200, 201, 202, 203. In various embodiments, the cache memory 210, 212, 214, 216, 220, 222, 230, 240 may be managed using an eviction policy to replace data and/or instructions stored in the cache memory 210, 212, 214, 216, 220, 222, 230, 240 to allow for storing other data and/or instructions. Evicting data and/or instructions may include writing the evicted data and/or instructions evicted from a higher level cache memory 210, 212, 214, 216, 220, 222, 230 to a lower level cache memory 220, 222, 230, 240 and/or other memory.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

Figure 3:
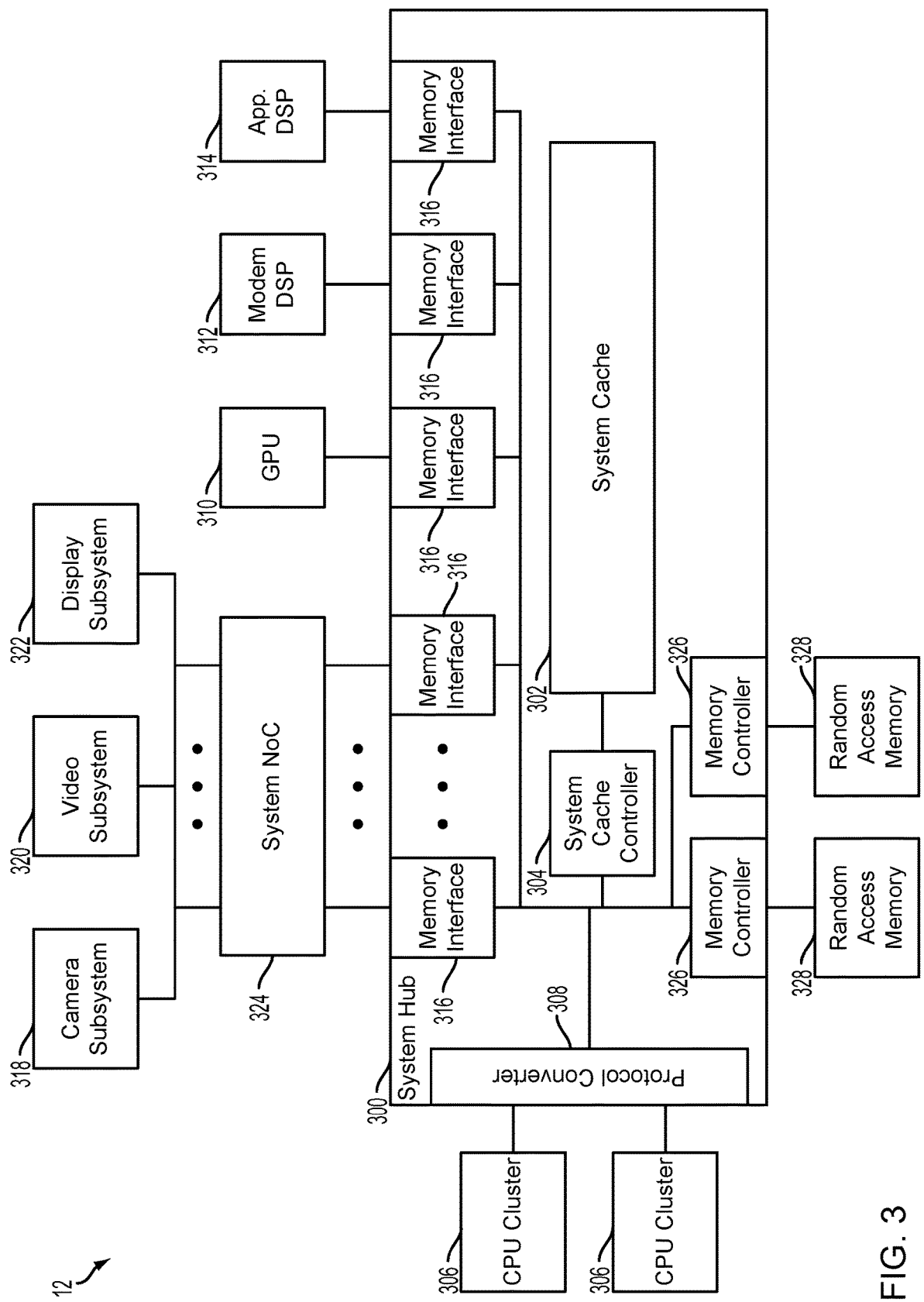
FIG. 3 is a block diagram illustrating an example computing device suitable for implementing various embodiments.

FIG. 3 illustrates a computing device with multiple clients and resource components suitable for implementing an embodiment. With reference to FIGS. 1-3, the SoC 12 may include a variety of components as described above. Some such components and additional components may be clients and/or resource components for aggregated resource control (described further herein).

An SoC 12 configured to implement aggregated resource control may include various communication components configured to communicatively connect the components of the SoC 12 that may transmit, receive, and share data. The communication components may include a system hub 300, a protocol converter 308, and a system network on chip (NoC) 324. The communication components may facilitate communication between clients and/or resource components, such as processors (e.g., processor 14 illustrated in FIGS. 1 and 2) in CPU clusters 306 and various subsystems, such as camera, video, and display subsystems 318, 320, 322, and may also include other specialized processors such as a GPU 310, a modem DSP 312, an application DSP 314, and other hardware accelerators. The communication components may facilitate communication between the clients and various resource components, such as memory devices, including a system cache 302 (e.g., shared system cache 240 illustrated in FIG. 2), a random access memory (RAM) 328 (e.g., memory 16 illustrated in FIG. 1), various memories included in the CPU clusters 306 and the various subsystems 318, 320, 322, such as caches (e.g., cache memory 210, 212, 214, 216, 220, 222, 230 illustrated in FIG. 2).

Various memory control devices, such as a system cache controller 304, a memory interface 316, and a memory controller 326, may be configured to control access to the various memories by the clients and implement operations for the various memories, which may be requested by the clients.

The descriptions herein of the SoC 12 and its various components illustrated in FIG. 3 are only meant to be examples and in no way limiting. Several of the components of the illustrated example SoC 12 may be variably configured, combined, and separated. Several of the components may be included in greater or fewer numbers, and may be located and connected differently within the SoC 12 or separate from the SoC 12. Similarly, numerous other components, such as other memories, processors, subsystems, interfaces, and controllers, may be included in the SoC 12 and in communication with the system cache controller 304 in order to access the system cache 302.

Figure 4:
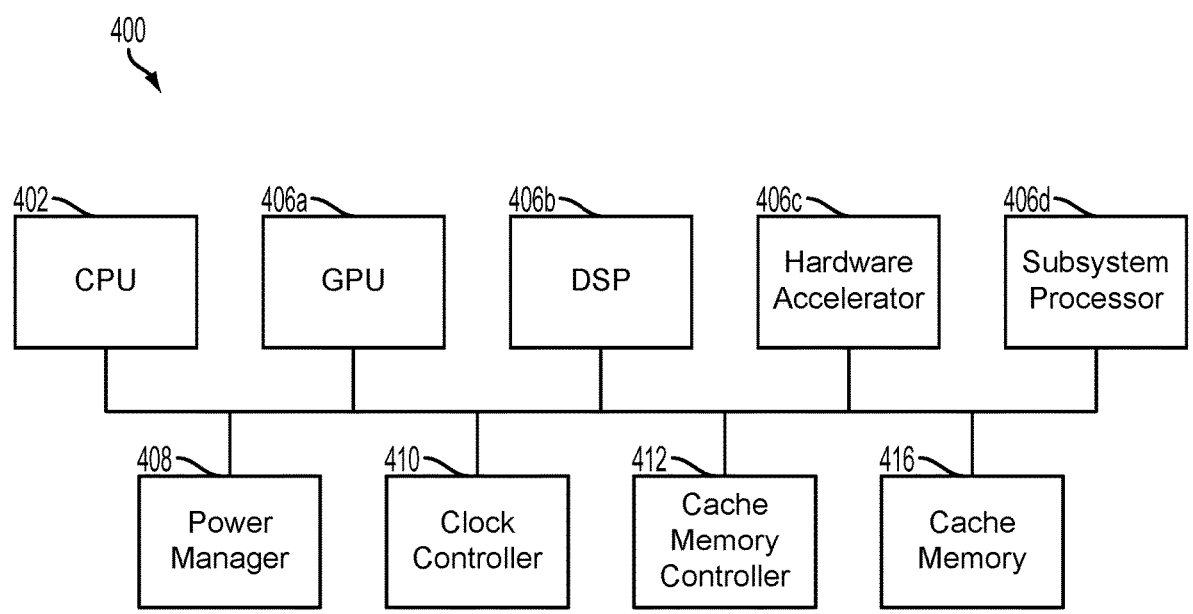
FIG. 4 is a block diagram illustrating an example computing device suitable for implementing various embodiments.

FIG. 4 illustrates an example computing device 400 (e.g., the computing device 10 illustrated in FIG. 1) suitable for implementing various embodiments. The computing device 400 may include any number of clients, such as any number of processing devices (e.g., processor 14 in FIGS. 1 and 2) and/or any number of applications running on such processing devices. A processing device may include a processing device (e.g., CPU) 402, hardware accelerator (e.g., GPU) 406a, hardware accelerator (e.g., DSP) 406b, custom hardware accelerator 406c, and/or subsystem processor 406d.

The computing device 400 may include any number of cache memories 416 (e.g., memory 16, 24 illustrated in FIG. 1, cache memory 210, 212, 214, 216, 220, 222, 230, 240 illustrated in FIG. 2, system cache 302 illustrated in FIG. 3). The computing device 400 may include any number of cache memory controllers 412 (e.g., system cache controller 304 illustrated in FIG. 3). In various embodiments, a cache memory 416 and/or a cache memory controller 412 may be a component(s) integral to a processing device 402, 406a, 406b, 406c, 406d.

A client 402, 406a, 406b, 406c, 406d may be configured to make access requests for use of a cache memory 416. A cache memory controller 412 may be configured to control access to a cache memory 416, such as read and/or write access to the cache memory 416, and/or to maintenance operations for the cache memory 416. The cache memory maintenance operations may include flushing data from the cache memory 416. To flush data from the cache memory 416, the cache memory controller 412 may cause the data from the cache memory 416 to be written back to another memory (e.g., memory 16, 24 illustrated in FIG. 1, cache memory 220, 222, 230, 240 illustrated in FIG. 2, system cache 302 illustrated in FIG. 3), such as a lower level cache memory, a RAM, or a storage device (e.g., hard drive). During a cache memory flush, clean data (data already stored in the other memory and unaltered while in the cache memory 416) may not need to be written back to the other memory. During a cache memory flush, dirty data (data different from data already stored in the other memory, whether the data is new data or altered while in the cache memory 416) may be written back to the other memory. While flushing the cache memory 416, the cache memory 416 may be unavailable for access by the clients 402, 406a, 406b, 406c, 406d.

The computing device 400 may include controllers, such as a power manager 408 (e.g., the power manager 28 illustrated in FIG. 1) and a clock controller 410 (e.g., the clock controller 30 illustrated in FIG. 1). The power manager 408 may be configured to control a power state of all or portions of a cache memory 416, referred to herein as regions. In various embodiments, the power states may include various nonoperational, low power, and/or operational levels. For example, the cache memory power states may include an off/collapsed nonoperational level; a retention low power level, which may not be enough power to be an operational level, but may be enough power to retain data; and/or various operational levels, such as high power, medium, power, low power, and/or, in increasing order of power, level 1, level 2, level 3, level 4, etc. The clock controller 410 may be configured to control the clock mode, such as an oscillating frequency of a crystal oscillator and/or gate signal, provided to the other components 402, 406a, 406b, 406c, 406d, 408, 412, 416. In various embodiments, the various clock modes may be used to generate signals between the components 402, 406a, 406b, 406c, 406d, 408, 412, 416 used to indicate and/or calculate timing of the various power states and/or activity states of the components 402, 406a, 406b, 406c, 406d, 408, 412, 416.

In various embodiments, timers (not shown) may be used by the clients 402, 406a, 406b, 406c, 406d and the power manager 408 to track when the clients 402, 406a, 406b, 406c, 406d may transition between power states and/or activity states and/or how long the clients 402, 406a, 406b, 406c, 406d may be in a power state and/or activity state. The power manager 408 may track the power states and/or activity states of the clients 402, 406a, 406b, 406c, 406d. In various embodiments, activity states may include active and idle, which may indicate to the power manager 408 whether the clients 402, 406a, 406b, 406c, 406d will be accessing the cache memory 416. For example, in an active state, a client 402, 406a, 406b, 406c, 406d may access the cache memory 416 at any time, but not access the cache memory 416 when in an idle state. In various embodiments, the activity state of a client 402, 406a, 406b, 406c, 406d may access the cache memory 416 may be indicated by the power state of the client 402, 406a, 406b, 406c, 406d. For example, an off/collapsed nonoperational level or a retention low power level may be correlated with an idle activity state. Various operational levels, such as high power, medium, power, low power, and/or, in increasing order of power, level 1, level 2, level 3, level 4, etc. may be correlated with an active activity state.

A client 402, 406a, 406b, 406c, 406d may signal to the power manager 408 a current and/or expected power state and/or activity state for the client 402, 406a, 406b, 406c, 406d. In various embodiments, the client 402, 406a, 406b, 406c, 406d may signal to the power manager 408 a time for transitioning to and/or from the indicated power state and/or activity state, as well as a duration for the indicated power state and/or activity state.

The power manager 408 may correlate the client 402, 406a, 406b, 406c, 406d with any number of regions of the cache memory 416. In various embodiments, the power manager 408 may correlate the client 402, 406a, 406b, 406c, 406d with a region of the cache memory 416 by indication from the 402, 406a, 406b, 406c, 406d, and/or based on stored data associating the region and the client 402, 406a, 406b, 406c, 406d. Depending on the power state and/or activity state of the client 402, 406a, 406b, 406c, 406d, the power manager 408 may determine an activity state for the associated regions of the cache memory 416. For example, a region of a cache memory 416 associated with a client exhibiting an idle activity state may also exhibit an idle activity state. A region of a cache memory 416 associated with a client exhibiting an active activity state may also exhibit an active activity state. In various embodiments the power state and/or activity state of the client 402, 406a, 406b, 406c, 406d and/or the region of the cache memory 416 may be immediate, based on a current power state and/or activity state, or expected, based on a time for transitioning to and/or from a power state and/or activity state or lapse of a duration of a power state and/or activity state.

Based on the power state and/or activity state of the client 402, 406a, 406b, 406c, 406d and/or the region of cache memory 416, the power manager 408 may determine whether to commence flushing the region of the cache. For example, the power manager 408 may issue a start cache memory flush signal to prompt the cache memory controller 412 to flush a region of the cache memory 416 in response to an idle activity state of the client associated with the region and/or or the region itself. In various embodiments, the start cache memory flush signal may indicate the region of the cache memory 416 to be flushed. The power manager 408 may issue an abort cache memory flush signal to prompt the cache memory controller 412 to abort a flush of a region of the cache memory 416 in response to an active activity state of the client 402, 406a, 406b, 406c, 406d associated with the region and/or or the region itself.

In various embodiments, the power manager 408 may issue the start and/or abort cache memory flush signals based on an immediate and/or expected power state and/or activity state of the client 402, 406a, 406b, 406c, 406d and/or the region of the cache memory 416. For example, a change in immediate power state and/or activity state of the client 402, 406a, 406b, 406c, 406d and/or the region of the cache memory 416 may prompt the power manager 408 to issue the start and/or abort cache memory flush signals in response to the change in immediate power state and/or activity state. A change in power state and/or activity state of the client 402, 406a, 406b, 406c, 406d and/or the region of the cache memory 416 indicated by an expected power state and/or activity state may prompt the power manager 408 to issue the start and/or abort cache memory flush signals at appropriate times in relation to the expected power state and/or activity state. The power manager 408 may issue a start cache memory flush signal at or after a time of an expected power state and/or activity state, such as an expected idle activity state. The power manager 408 may issue an abort cache memory flush signal at or before a time of an expected power state and/or activity state, such as an expected active activity state.

The power manager 408 may also control the power state of the regions of the cache memory 416. In response to completion of a flush of a region of a cache memory 416, the power manager may lower the power state of the region of the cache memory 416. For example, the power manager 408 may set the power state of the region of the cache memory 416 from a retention low power level or an operational level to an off/collapsed nonoperational level. A request from a client 402, 406a, 406b, 406c, 406d for access to an off/collapsed nonoperational level region of the cache memory 416 may prompt the power manager 408 to transition the power state of the region to a retention low power level or an operational level.

The cache memory controller 412 may be configured to implement the cache maintenance operations, including flushing regions of the cache memory 416. Further, the cache memory controller 412 may be configured to determine how to implement flushing regions of the cache memory 416. The cache memory controller 412 may flush a region of the cache memory 416 in response to receiving a start cache memory flush signal, which may include an indicator of the region to be flushed. The cache memory controller 412 may abort flushing the region of the cache memory 416 in response to receiving an abort cache memory flush signal. In various embodiments, the cache memory controller 412 may flush a region of the cache memory 416 by sections of the region of the cache memory 416. The region of the cache memory 416 may be any amount of the cache memory, such any number of cache lines or blocks, cache sets, cache ways, and/or cache banks. The section of the region of the cache memory 416 may be any portion of the cache memory 416 smaller than the region of the cache memory 416, such as any number of cache lines or blocks, cache sets, cache ways, and/or cache banks.

In response to an abort cache memory flush signal, the cache memory controller 412 may continue the cache memory flush of a section of the region of the cache memory 416 that is being flushed, and abort the cache memory flush upon completion of the flush of that section. Allowing the flush of the section of the region of the cache memory 416 to complete may result in some latency with respect to the client 402, 406a, 406b, 406c, 406d being able to access the cache memory 416, but the latency is less than if the client 402, 406a, 406b, 406c, 406d has to wait for a flush of the entire cache memory 416 to finish.

In various embodiments, the cache memory controller 412 may be configured to determine how to implement flushing regions of the cache memory 416. The cache memory controller 412 may be programmed with any number of algorithms, heuristics, and/or techniques for selecting and/or ordering any number of sections of the region of the cache memory 416 to flush. The cache memory controller 412 may be configured to select and order the sections of the region of the cache memory 416 based on an amount of power saved by powering down the sections. Determining the amount of power saved may be based on the amount of power used by the section, such as determined by the size of the section and/or the amount of data stored in the section. The cache memory controller 412 may select the sections with the highest power usage first and order the flush of the sections from highest power usage to lowest power usage. In this manner, the rate at which cache memory power demands are reduced may be greatest early in the process of the flushing the cache memory 416, thus requiring less power for a longer period of time and increasing the power savings achieved by depowering idle regions of cache memory.

In some embodiments, the cache memory controller 412 may be configured to select and order the sections of the region of the cache memory 416 for flushing based on an amount of time needed to flush each section. The power manager 408 may inform the cache memory controller 412 of a duration of or expected end of an idle state period for the region of the cache memory 416. The cache memory controller 412 may select any number of sections to flush that can be flushed by approximately the end of the duration or the expected end of the idle state period of the region of the cache memory 416. In various embodiments, the number sections within a region of cache memory that can be flushed within the duration or by the expected end of the idle state period of the region may include the number of sections that can be completely flushed before or coinciding with the end of the idle state period of the region. In various embodiments, the number sections that can be flushed within the duration or by the expected end of the idle state period of the cache memory region may include the number of sections that can be flushed within a threshold amount of time before the end of the duration or before the expected end of the idle state period of the region. The threshold amount of time before the end of the duration or before the expected end of the idle state period of the cache memory region may be an amount of time that provides an acceptable latency for the client 402, 406a, 406b, 406c, 406d to access the cache memory 416.

In some embodiments, the cache memory controller 412 may be configured to select and order the sections of the region of the cache memory 416 based on a degree of dirtiness of data stored in the sections. Each section of the region of the cache memory 416 may be tagged with a dirtiness indicator signifying the dirtiness of the data stored in the section. The degrees of dirtiness may be a binary degree of dirty or clean, or may include varying levels of dirtiness to indicate how much of the data stored in the section may need to be written back to another memory. The cache memory controller 412 may be programmed to select and order the sections of the region of the cache memory from least dirty to most dirty. This ordering may be advantageous because the less dirty the data stored in a section, the less data that needs to be written back to another memory during a flush, the shorter the time needed to flush the section, and the less the amount of power needed to flush the section. The amount of data needing to be written back to another memory, the amount of time needed to flush a section, and the amount of power needed to flush a section may increase the dirtier the data stored in a section.

In some embodiments, the cache memory controller 412 may be configured to select the sections of the region of the cache memory 416 based on a flushability status of the section. The term "flushability" refers to whether data stored at a section is flushable or not flushable. Flushable data may be data that the client 402, 406a, 406b, 406c, 406d does not foresee needing fast access to and thus may be removed from the cache memory 416 and written back to another memory without incurring a performance penalty. Not flushable data may be data that the client 402, 406a, 406b, 406c, 406d does foresee needing fast access to and should be kept in the cache memory 416 for fast access. In some embodiments, sections of the cache memory 416 may be tagged with a flushability status indicator signifying whether the client 402, 406a, 406b, 406c, 406d allows the data stored in a section to be flushed. In such embodiments, the client 402, 406a, 406b, 406c, 406d may indicate to the power manager 408, and the power manager 408 may indicate to the cache memory controller (e.g., via the start cache memory flush signal) the flushability status indicator signifying whether the client 402, 406a, 406b, 406c, 406d allows the data stored at a section to be flushed. The cache memory controller 412 may select sections to flush that are indicated as flushable and may not select sections that are indicated as not flushable.

FIG. 4 illustrates a non-limiting example of a computing device 400. The example computing device 400 illustrated and described herein is meant to be non-limiting. A computing device 400 may include any number and/or combination of processing devices, controllers, memories, interconnects, and connections between such components. In various embodiments, any combination of the components of a computing device 400 may be combined or separated and included as part of or distributed over multiple SoCs (e.g., SoC 12 in FIGS. 1 and 3) which may be communicatively connected.

Various embodiments are described with reference to FIGS. 5-11 refer to example hardware components described with reference to FIGS. 1-4. The following references to combinations of hardware components are in no way limiting to the number or types of processors, hardware accelerators, controllers, and/or memories that may be included as hardware components for implementing the various embodiments described herein. Various embodiments may be implemented using any combination of components.

Figure 5A:
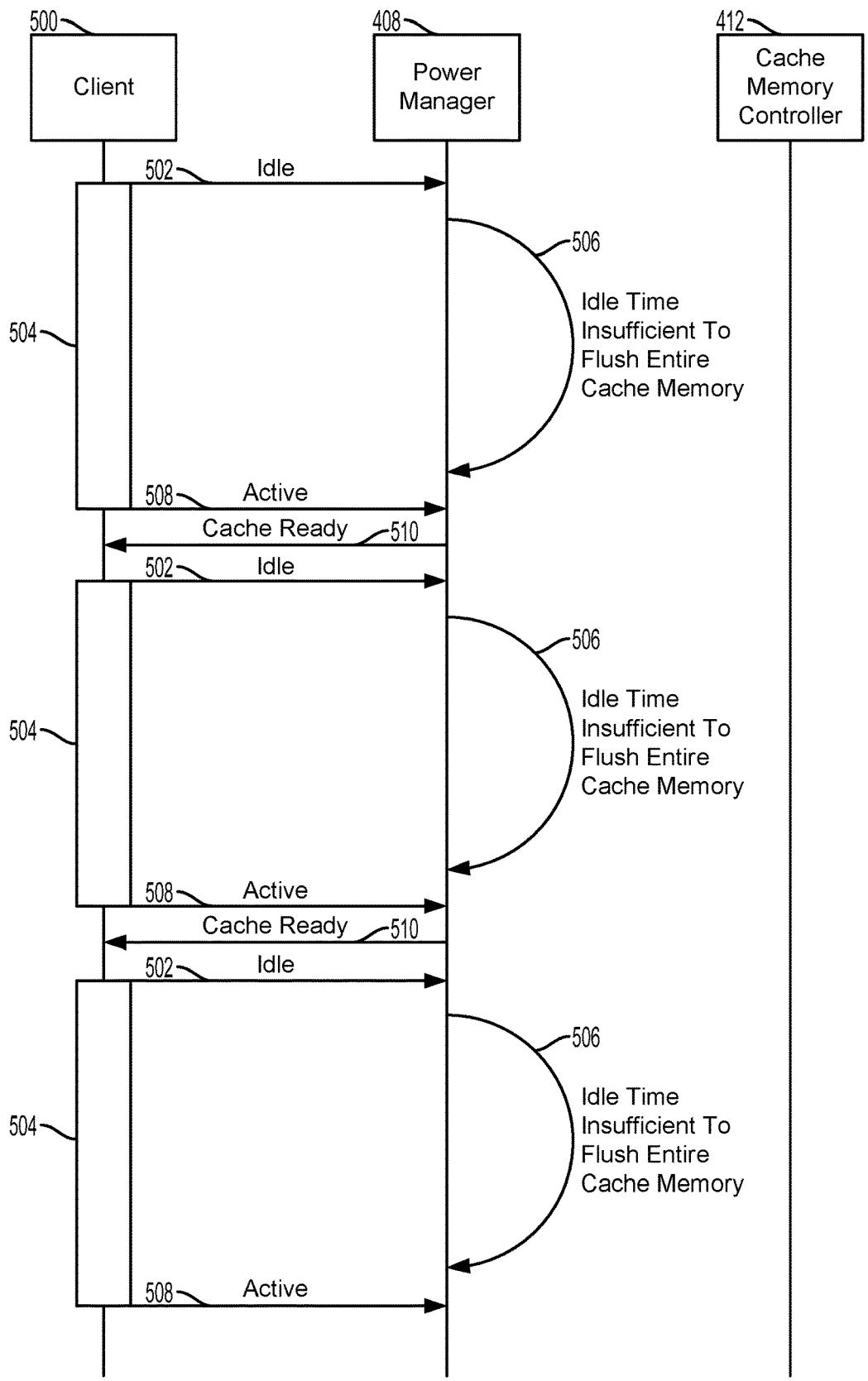
FIGS. 5A and 5B are component block and signaling diagrams illustrating non-progressive and progressive flushing of a cache memory according to an embodiment.

FIG. 5A illustrates an example of non-progressive flushing of cache memory. The example illustrated in FIG. 5A includes signaling between a client 500 (e.g., client 402, 406a, 406b, 406c, 406d illustrated in FIG. 4), the power manager 408, and the cache memory controller 412. The client 500 may send an activity state notification 502 indicating that the client 500 is idle or will be idle. The activity state notification 502 indicating that the client 500 will be idle may include a time until or at which the client 500 will be idle. The activity state notification 502 may also include a duration of how long the client will be idle. The client may enter an idle activity state 504 for a duration.

The power manager 408 may receive the activity state notification 502 indicating that the client 500 is idle or will be idle. The power manager 408 may determine whether the idle time of the client 500 is sufficient to flush the entire cache memory 506. Generally, the idle time of the client will be insufficient to flush the entire cache memory. As a result, the power manager 408 will not act to prompt flushing of the cache memory, such as by not sending a start cache memory flush signal to the cache memory controller 412.

The client 500 may send an activity state notification 508 indicating that the client 500 is active or will be active. The power manager 408 may receive the activity state notification 508 indicating that the client 500 is active or will be active, and the power manager may respond by sending a signal 510 that the cache memory is ready or available for access by the client 500.

This process may repeat indefinitely as long as the client 500 is idle for a duration that is insufficient to flush the entire cache memory before the client 500 becomes active. This may result in long periods of storing data in the cache memory that is not needed by the client 500 and using power to retain that unneeded data in the cache memory.

Figure 5B:
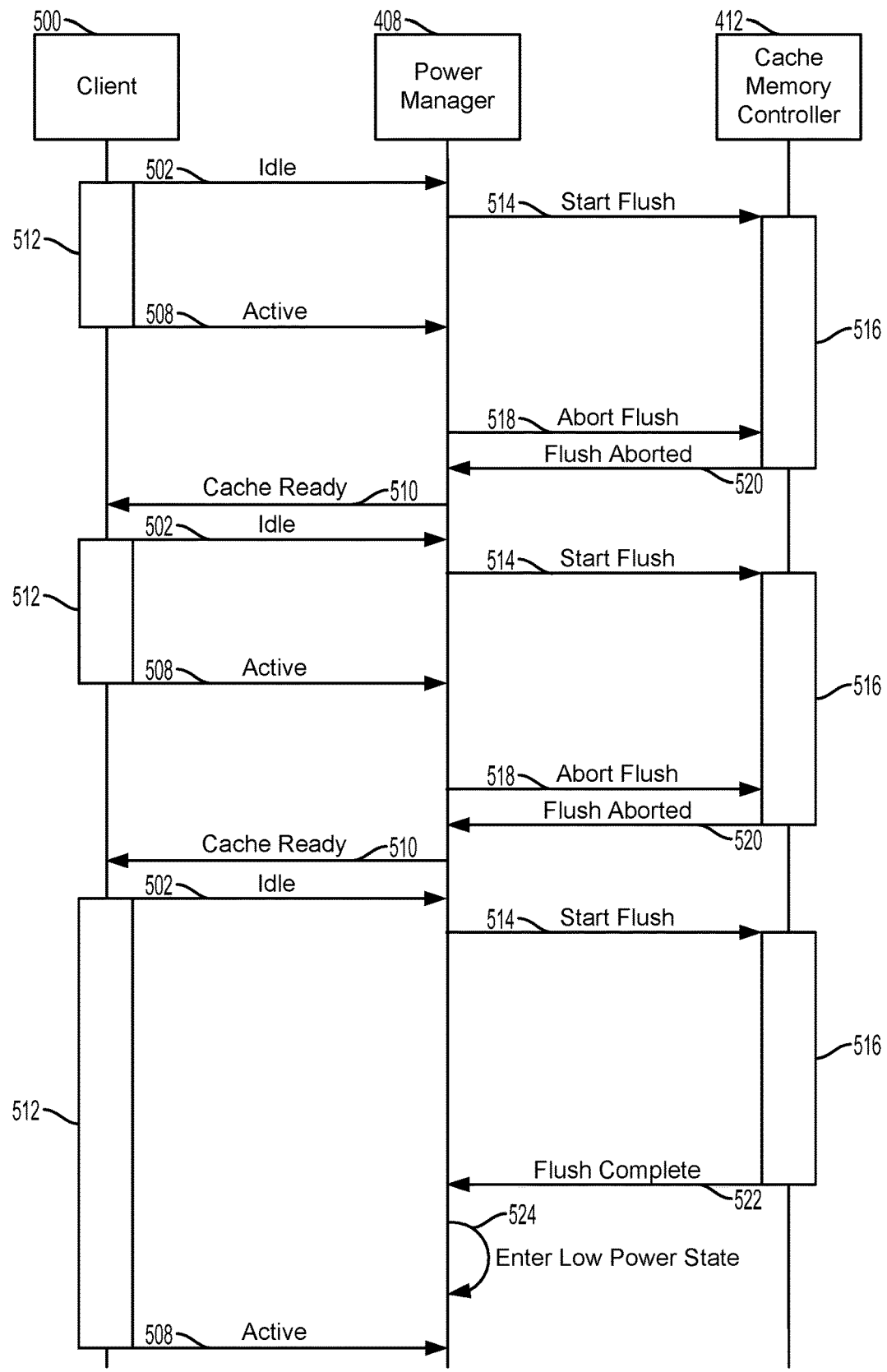

FIG. 5B illustrates progressive flushing of a cache memory (e.g., cache memory 416 illustrated in FIG. 4) according to an embodiment. The example illustrated in FIG. 5B includes signaling between a client 500 (e.g., client 402, 406a, 406b, 406c, 406d illustrated in FIG. 4), the power manager 408, and the cache memory controller 412.

The client 500 may send an activity state notification 502 indicating that the client 500 is idle or will be idle. The client 500 may include with the activity state notification 502 indicating that the client 500 will be idle or send separately a time until or at which the client 500 will be idle, a duration of how long the client will be idle, a time at which the client 500 will transition to an active state, a region of the cache memory associated with the client 500, and/or flushability status indicators for sections of the region. The client may enter an idle activity state 512 for a duration.

The power manager 408 may receive the activity state notification 502 indicating that the client 500 is idle or will be idle. The power manager 408 may send a start cache memory flush signal 514 to the cache memory controller 412. In some embodiments, the power manager 408 may include with the start cache memory flush signal 514 or send separately a region of the cache memory to flush, the duration of the idle state for the client 500 and/or expected time the client 500 is to transition to an active state, and/or flushability status indicators for sections of the region.

The cache memory controller 412 may receive that start cache memory flush signal 514. Based on various factors, including the amount of power saved by powering down a section of the region of the cache memory, amount of time to flush a section, dirtiness of a section, flushability of a section, and/or duration of the idle state of the client and/or time at which the client will transition to an active state, the cache memory controller 412 may select and order sections to flush. The cache memory controller 412 may commence flushing the region of the cache memory 516.

The client 500 may end its idle activity state 512 and transition to an active activity state. At or near the end of the idle activity state 512, the client 500 may send an activity state notification 508 indicating that the client 500 is active or will soon be active. The power manager 408 may receive the activity state notification 508 indicating that the client 500 is active or will soon be active, and the power manager may respond by sending an abort cache memory flush signal 518 to the cache memory controller 412. In some embodiments, the client 500 may not send the activity state notification 508 indicating that the client 500 is active or will be active, and the power manager 408 may be aware of the client 500 transitioning to the active activity state based on information received indicating the duration of the idle activity state and/or a time when the client is to transition to the active activity state. The power manager 408 may send the abort cache memory flush signal 518 to the cache memory controller 412 based on the previously received information rather than based on receiving the activity state notification 508 indicating that the client 500 is active or will be active.

In response to receiving the abort cache memory flush signal 518, the cache memory controller 412 may abort the flush the region of the cache memory 516. In various embodiments, the cache memory controller 412 may complete a flush of a section the region of the cache memory being flushed at the time the abort cache memory flush signal 518 is received and then abort the flush the region of the cache memory 516. The cache memory controller 412 may return a cache memory flush abort acknowledgement signal 520 to the power manager 408.

In response to receiving the cache memory flush abort acknowledgement signal 520, the power manager may send a signal 510 that the cache memory is ready or available for access by the client 500.

This process illustrated in FIG. 5B may repeat for the region of the cache memory as long as the region remains in a powered state, even a low powered state. The region of the cache memory may remain in a powered state as long as it retains data. The region of the cache memory may retain data while data stored in the region is tagged as not flushable or as long as the flush of the region of the cache memory is incomplete, such as when the flush of the region of the cache memory is aborted prior to completion. Data may be written to sections of the region of the cache memory by processes subsequent to a flush of the section during a flush of the region of the cache memory. Writing data to previously flushed section may prolong when a flush of a region of the cache memory may complete.

In various embodiments, a flush of the region of the cache memory may complete after any number of progressive flushes of the region of the cache memory. A flush of the region of the cache memory may complete when there is no data or dirty data stored in any section of the region of the cache memory.

In response to completing the flush of the region of the cache memory, the cache memory controller 412 may send a cache memory flush complete indicator signal 522 to the power manager 408. The power manager 408 may receive the cache memory flush complete indicator signal 522 and transition the flushed region of the cache memory to a low power or off state 524.

Figure 6:
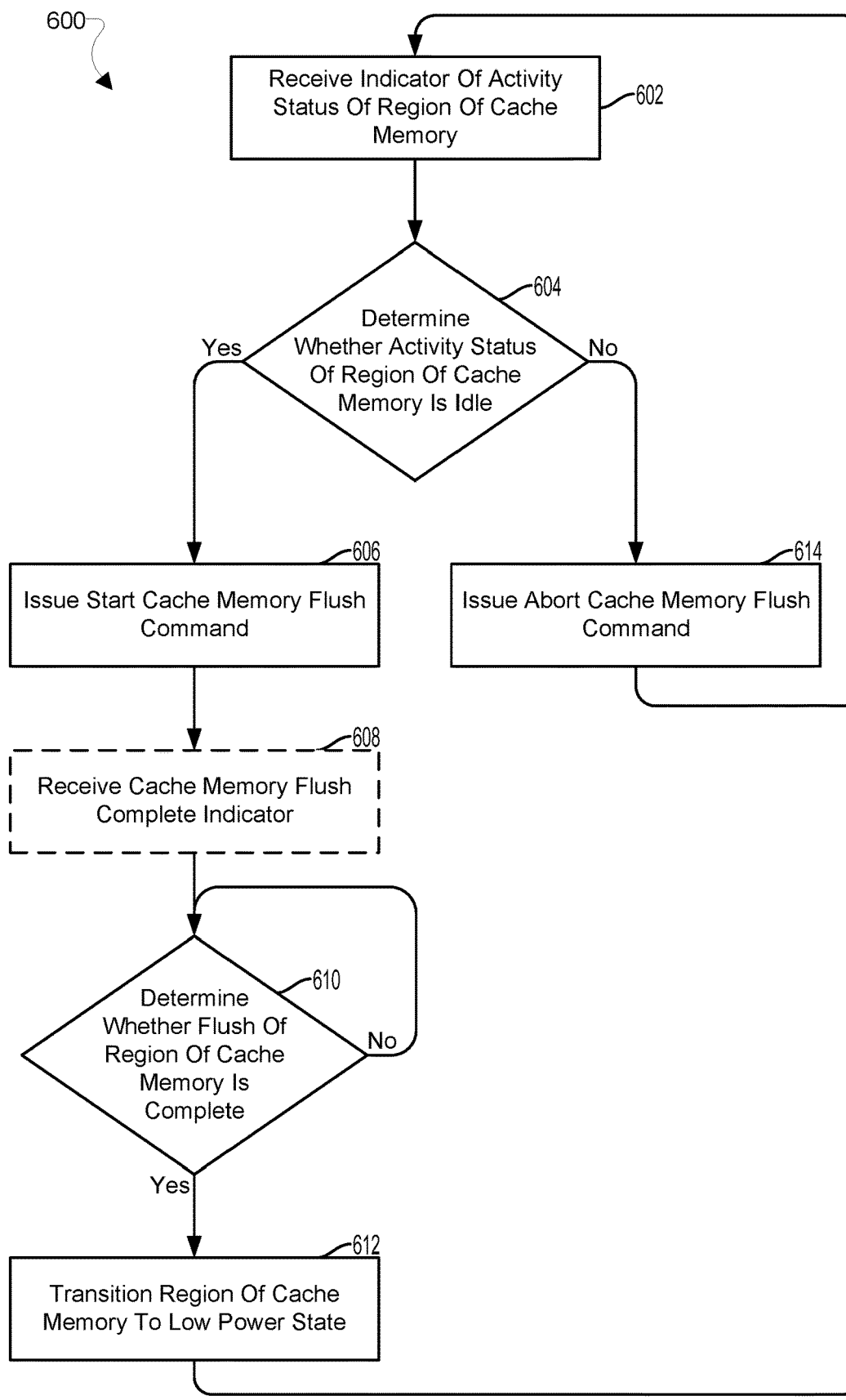
FIG. 6 is a process flow diagram illustrating a method for progressive flushing of a cache memory according to an embodiment.

FIG. 6 illustrates a method 600 for progressive flushing of a cache memory according to an embodiment. The method 600 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406a, 406b, 406c, 406d illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 600 is referred to herein as a "processing device." In various embodiments, any of the blocks 602-614 may be implemented repeatedly and in parallel with any of the other blocks 602-614.

In block 602, the processing device may receive an indicator of an activity status of a region of cache memory. In various embodiments, the processing device may receive an indicator an activity status of any number of clients associated with the region of the cache memory and derive the activity status of region of the cache memory from the activity statuses of the clients. The activity status of a region of the cache memory and of each of the clients associated with the region of the cache memory may include an idle activity status indicator or an active activity status indicator. The activity status indicator of the region of the cache memory may correspond to the activity status of an indicator of a single client for a region associated only with the single client. The activity status indicator of the region of the cache memory may correspond to a single active activity status indicator of a client associated with the region of the cache memory among a plurality of clients associated with the region. The activity status indicator of the region of the cache memory may correspond to only idle activity status indicators of all of a plurality of clients associated with the region of the cache memory. In various embodiments, receiving an activity status of a client associated with the region of the cache memory may include or the processing device may separately receive a time until or at which the client will be idle, a duration of how long the client will be idle, a time at which the client 500 will transition to an active state, a region of the cache memory associated with the client, and/or flushability status indicators for sections of the region. In various embodiments, the processing device may receive an indicator of an activity status of a region of cache memory in block 602 at any time and in parallel with any of the block 604-614.

In determination block 604, the processing device may determine whether the activity status of the region of the cache memory is idle. In various embodiments, the processing device may determine the activity status of the region of the cache memory from an indicator of the activity status of the region. In various embodiments, the processing device may determine the activity status of the region of the cache memory as derived from the activity status of any number of clients associated with the region. The processing device may determine that the activity status of the region of the cache memory is active in response to a single client associated with the region having an active activity status indicator. The processing device may determine that the activity status of the region of the cache memory is idle in response to every client associated with the region having an idle activity status indicator.

In response to determining that the activity status of the region of the cache memory is idle (i.e., determination block 604="Yes"), the processing device may issue a start cache memory flush command signal in block 606. The processing device may issue the start cache memory flush command signal by generating and sending the start cache memory flush command signal. The processing device may include with the start cache memory flush command signal or send separately a region of the cache memory to flush, the duration of the idle state for the client and/or expected time the client is to transition to an active state, and/or flushability status indicators for sections of the region. The start cache memory flush command signal may indicate to a processing device implementing the method 700 described herein with reference to FIG. 7 to start a flush of the region of the cache memory.

In optional block 608, the processing device may receive a cache memory flush complete indicator signal. The cache memory flush complete indicator signal may include a cache memory flush complete indicator configured to indicate to the processing device that the flush of the region of the cache memory is complete. In various embodiments, a flush of the region of the cache memory may complete after any number of progressive flushes of the region of the cache memory. A flush of the region of the cache memory may complete when there is no data or dirty data stored in any section of the region of the cache memory.

In determination block 610, the processing device may determine whether the flush of the region of the cache memory is complete. The processing device may determine whether the flush of the region of the cache memory is complete based on whether the processing device has received the cache memory flush complete indicator signal in optional block 608.

In response to determining that the flush of the region of the cache memory is not complete (i.e., determination block 610="No"), the processing device may repeatedly determine whether the flush of the region of the cache memory is complete in determination block 610. As described herein, this loop may be interrupted and aborted in response to later determining that the activity status of the region of the cache memory is not idle (i.e., determination block 604="No").

In response to determining that the flush of the region of the cache memory is complete (i.e., determination block 610="Yes"), the processing device may transition the region of the cache memory to a low power or off power state in block 612. The processing device may also return to receiving an indicator of an activity status of a region of cache memory in block 602.

In response to determining that the activity status of the region of the cache memory is not idle (i.e., determination block 604="No"), the processing device may issue an abort cache memory flush command signal in block 614. The processing device may issue the abort cache memory flush command signal by generating and sending the abort cache memory flush command signal. The abort cache memory flush command signal may indicate to a processing device implementing the method 700 described herein with reference to FIG. 7 to abort the flush of the region of the cache memory. As a result of commanding an abort of the flush of the region of the cache memory in block 614, the processing device may terminate a loop of determining whether the flush of the region of the cache memory is complete in determination block 610. The processing device may also return to receiving an indicator of an activity status of a region of cache memory in block 602.

Figure 7:
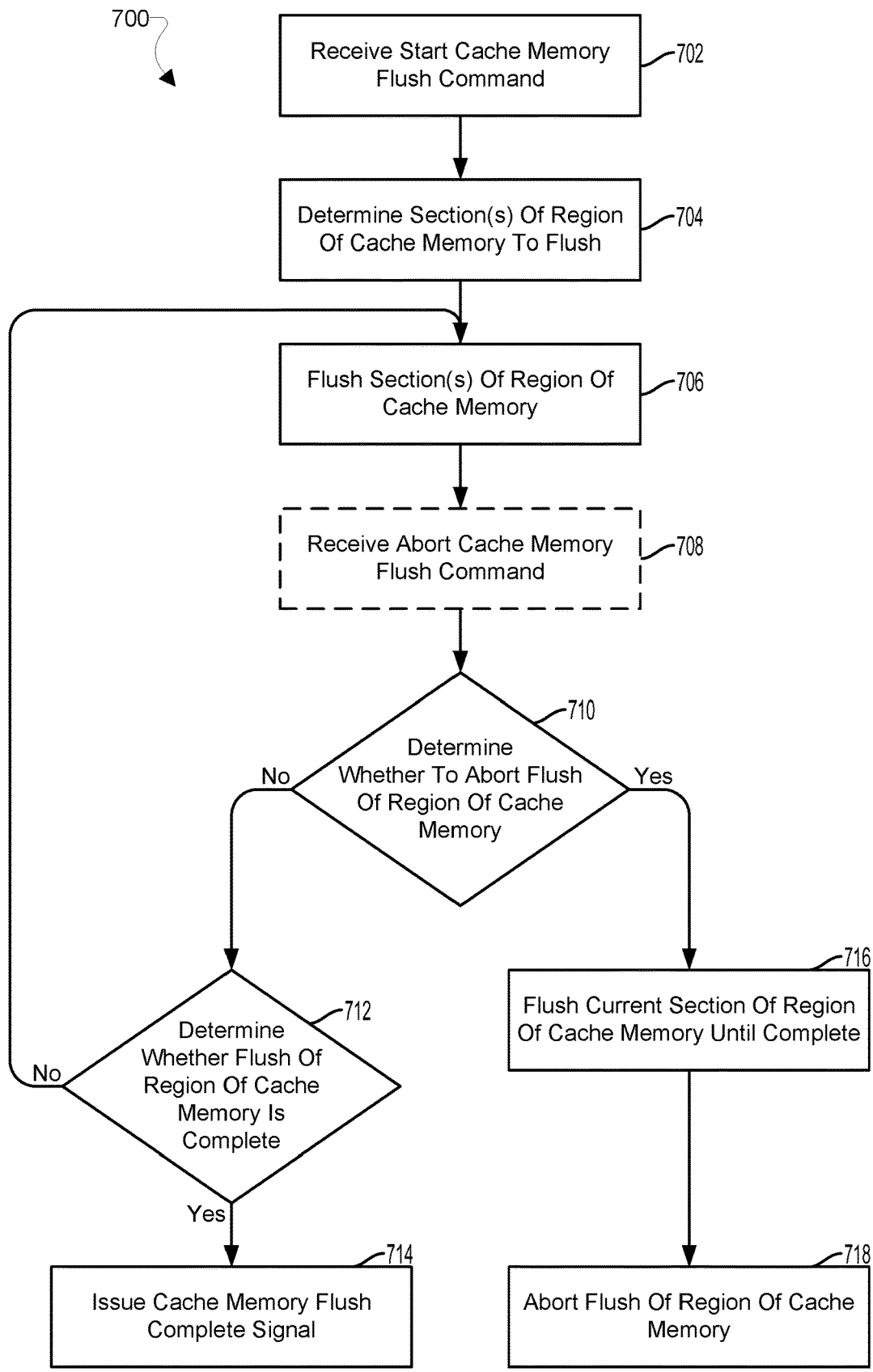
FIG. 7 is a process flow diagram illustrating a method for progressive flushing of a cache memory according to an embodiment.

FIG. 7 illustrates a method 700 for progressive flushing of a cache memory according to an embodiment. The method 700 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406*a*, 406*b*, 406*c*, 406*d* illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 700 is referred to herein as a "processing device." In various embodiments, any of the blocks 602-614 may be implemented repeatedly and in parallel with any of the other blocks 602-614. In various embodiments, the method 700 may be implemented in parallel with the method 600 illustrated in FIG. 6.

In block 702, the processing device may receive a start cache memory flush command signal. The start cache memory flush command signal may include or the processing device may receive separately a region of the cache memory to flush, the duration of the idle state for the client and/or expected time the client is to transition to an active state, and/or flushability status indicators for sections of the region. The start cache memory flush command signal may indicate to the processing device to start a flush of the region of the cache memory.

In block 704, the processing device may determine any number of sections of the region of the cache memory to flush. Based on various factors, including the amount of power saved by powering down a section of the region of the cache memory, amount of time to flush a section, dirtiness of a section, flushability of a section, and/or duration of the idle state of the client and/or time at which the client will transition to an active state, the processing device may select and order sections to flush, as discussed further herein with reference to the methods 800, 900, 1000, and 1100 in FIGS. 8-11. In various embodiments, the processing device may randomly, sequentially, or by any other pattern attempt to flush each section of the region of the cache memory. In various embodiments, the processing device may continually or repeatedly determine any number of sections of the region of the cache memory to flush in block 704. In this manner, sections of the region of the cache memory that may not have been previously determined for flushing for various reasons may be reevaluated and subsequently determined for flushing.

In block 706 the processing device may flush the section (s) of the region of the cache memory. The processing device may flush the section(s) of the region of the cache memory according to the section(s) selected and/or the order specified in block 704. The processing device may flush the section(s) of the region of the cache memory by writing data stored at the section(s) to another memory, such as a lower level cache memory, a RAM, and/or as storage device (e.g., hard drive), and/or invalidating the section(s).

In optional block 708, the processing device may receive an abort cache memory flush command signal. The abort cache memory flush command signal may indicate to the processing device to abort the flush of the region of the cache memory. In various embodiments, the processing device may receive an abort cache memory flush command signal in block 708 in parallel with any of the block 702-706 and 710-714.

In determination block 710, the processing device may determine whether to abort the flush of the region of the cache memory. The processing device may determine to abort the flush of the region of the cache memory in response to receiving the abort cache memory flush command signal. The processing device may determine not to abort the flush of the region of the cache memory in response to not receiving the abort cache memory flush command signal.

In response to determining not to abort the flush of the region of the cache memory (i.e., determination block 710="No"), the processing device may determine whether the flush of the region of the cache memory is complete in determination block 712. The processing device may determine whether the flush of the region of the cache memory is complete by whether any data or any dirty data remains in any section of the region of the cache memory. In response to no data or dirty data remaining in any section of the region of the cache memory, the processing device may determine that the flush of the region of the cache memory is complete. In response to any section of the region of the cache memory retaining data or dirty data, the processing device may determine that the flush of the region of the cache memory is not complete.

In response to determining that the flush of the region of the cache memory is not complete (i.e., determination block 712="No"), the processing device may continue to flush the section(s) of the region of the cache memory in block 706.

In response to determining that the flush of the region of the cache memory is complete (i.e., determination block 712="Yes"), the processing device may issue a cache memory flush complete indicator signal in block 714. The processing device may issue the cache memory flush complete indicator signal by generating and sending the cache memory flush complete indicator signal.

In response to determining to abort the flush of the region of the cache memory (i.e., determination block 710="Yes"), the processing device may continue a flush of a current section of the region of the cache memory being flushed until the flush of the current section is complete in block 716. The determination to abort the flush of the region of the cache memory may not coincide with a period between flushing of sections of the region. It is more likely that the determination to abort the flush of the region of the cache memory coincides with an ongoing flush of a section of the region. The process to abort the flush of the region of the cache memory may be postponed until the ongoing flush of the section of the region is complete. This postponement may increase latency in allowing access of a client to the region of the cache memory, however the latency is less than it would be having to wait for a flush of the entire cache memory to complete.

In block 718, the processing device may abort the flush of the region of the cache memory. Aborting the flush of the region of the cache memory may terminate the flush cache maintenance operations for the yet to be flushed sections of the region that were determined for flushing in block 704. These remaining sections may be flushed upon subsequent flushes of the region of the cache memory.

Figure 8:
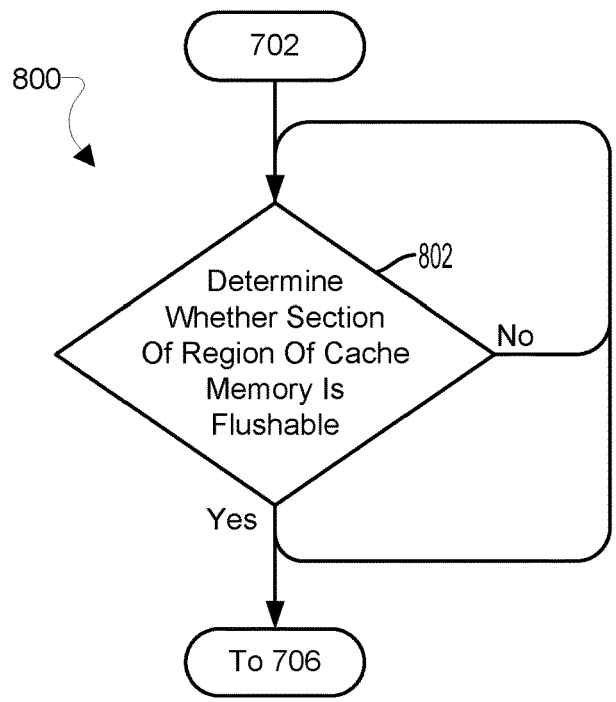
FIG. 8 is a process flow diagram illustrating a method for determining a section(s) of a region of a cache memory to flush according to an embodiment.

FIG. 8 illustrates a method 800 for determining a section(s) of a region of a cache memory to flush according to an embodiment. The method 800 includes an example of operations that may be performed in block 704 of the method 700 described with reference to FIG. 7, according to some embodiments. The method 800 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406a, 406b, 406c, 406d illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 800 is referred to herein as a "processing device."

In determination block 802, the processing device may determine whether a section of the region of the cache memory is flushable. As described herein, the sections of the regions of the cache memory may be tagged with a flushability indicator and/or a flushability indicator for the section may be received by the processing device with or separately from the start cache memory flush command signal received in block 702 of the method 700 described with reference to FIG. 7. The flushability indicator may indicate whether the section of the region of the cache memory is flushable or not flushable. The processing device may determine from the flushability indicator whether the section of the region of the cache memory is flushable.

In response to determining that the section of the region of the cache memory is not flushable (i.e., determination block 802="No"), the processing device may continue to determine whether another section of the region of the cache memory is flushable in determination block 802.

In response to determining that the section of the region of the cache memory is flushable (i.e., determination block 802="Yes"), the processing device may continue to determine whether another section of the region of the cache memory is flushable in determination block 802, and also flush the section(s) of the region of the cache memory in block 706 of the method 700 described with reference to FIG. 7.

Figure 9:
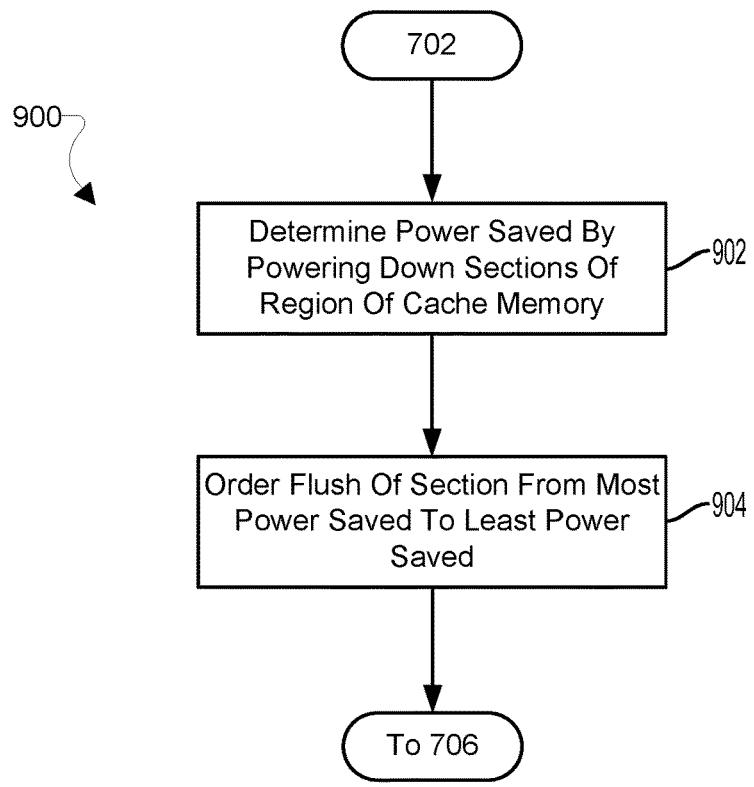
FIG. 9 is a process flow diagram illustrating a method for determining a section(s) of a region of a cache memory to flush according to an embodiment.

FIG. 9 illustrates a method 900 for determining a section(s) of a region of a cache memory to flush according to an embodiment. The method 900 includes an example of operations that may be performed in block 704 of the method 700 described with reference to FIG. 7, according to some embodiments. The method 900 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406a, 406b, 406c, 406d illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 900 is referred to herein as a "processing device."

In block 902, the processing device may determine an amount of power saved by powering down sections of a region of the cache memory. Determining the amount of power saved may be based on the amount of power used by a section, such as determined by the size of the section and/or the amount of data stored in the section.

In block 904, the processing device select the sections of the region of the cache memory with the highest power usage first and order the flush of the sections from highest power usage to lowest power usage. In this manner, the power demands by the cache memory may reduce more quickly earlier in the flushing of the cache memory and require less power to run for a longer period of time.

Figure 10:
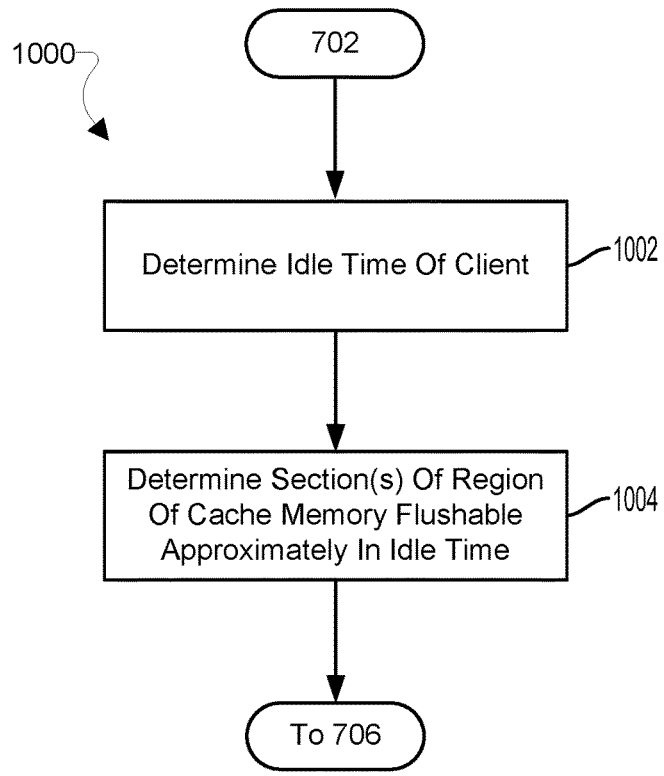
FIG. 10 is a process flow diagram illustrating a method for determining a section(s) of a region of a cache memory to flush according to an embodiment.

FIG. 10 illustrates a method 1000 for determining a section(s) of a region of a cache memory to flush according to an embodiment. The method 1000 includes an example of operations that may be performed in block 704 of the method 700 described with reference to FIG. 7, according to some embodiments. The method 1000 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406a, 406b, 406c, 406d illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 1000 is referred to herein as a "processing device."

In block 1002, the processing device may determine an idle time of a client. As described herein, a duration of the idle state for the client and/or expected time the client is to transition to an active state may be received by the processing device with or separately from the start cache memory flush command signal received in block 702 of the method 700 described with reference to FIG. 7. Determining the idle time of a client may be achieved by reading the received duration of the idle state or calculating a duration of the idle state from a current time and the time the client is to transition to an active state. In various embodiments, the idle time of the client may be used to derive the idle time of the region of the cache memory.

In block 1004, the processing device may determine a section(s) of the region of the cache memory that is flushable in approximately the idle time of the client. In various embodiments, the processing device may determine a section(s) of the region of the cache memory that is flushable in approximately the idle time of the region of the cache memory. The processing device may select any number of sections to flush that can be flushed by approximately by the end of the duration or the expected end of the idle state period of the client or the region of the cache memory. In various embodiments, a number sections that can be flushed by approximately the end of the duration or the expected end of the idle state period of the client or the region of the cache memory may include a number of sections that can be completely flushed before or coinciding with the end of the duration or the expected end of the idle state period of the client or the region of the cache memory. In various embodiments, a number sections that can be flushed by approximately the end of the duration or the expected end of the idle state period of the client or the region of the cache memory may include a number of sections that can be flushed within a threshold amount of time from the end of the duration or the expected end of the idle state period of the client or the region of the cache memory. The threshold amount of time from the end of the duration or the expected end of the idle state period of the client or the region of the cache memory may be an amount of time that includes an acceptable latency for the client to access the region of the cache memory.

Figure 11:
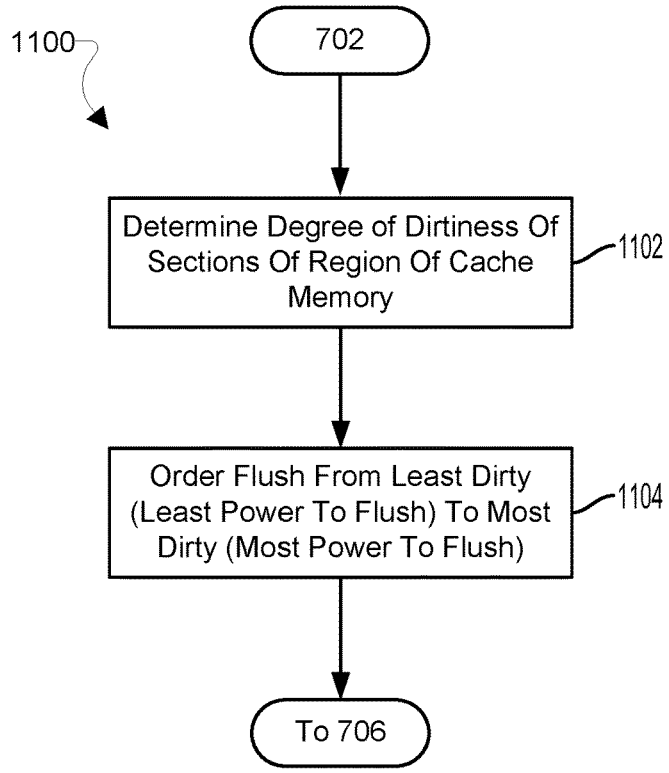
FIG. 11 is a process flow diagram illustrating a method for determining a section(s) of a region of a cache memory to flush according to an embodiment.

FIG. 11 illustrates a method 1100 for determining a section(s) of a region of a cache memory to flush according to an embodiment. The method 1100 includes an example of operations that may be performed in block 704 of the method 700 described with reference to FIG. 7, according to some embodiments. The method 1100 may be implemented in a computing device, in software executing in a processor (e.g., the processor 14 in FIGS. 1 and 2, processors 306, 310, 312, 314, and subsystems 318, 320, 322 illustrated in FIG. 3, and clients 402, 406a, 406b, 406c, 406d illustrated in FIG. 4), in general purpose hardware, in dedicated hardware (e.g., power manager 28 illustrated in FIG. 1, power manager 408 and cache memory controller 412 illustrated in FIG. 4), or in a combination of a software-configured processor and dedicated hardware, such as a processor executing software within a aggregated resource enabled system that includes other individual components (e.g., memory 16, 24 illustrated in FIG. 1, cache memory 210, 212, 214, 216, 220, 222, 230, 240 illustrated in FIG. 2, system cache 302 illustrated in FIG. 3), and various memory/cache controllers (e.g., cache memory controller 412 illustrated in FIG. 4). In order to encompass the alternative configurations enabled in various embodiments, the hardware implementing the method 1100 is referred to herein as a "processing device."

In block 1102, the processing device may determine a degree of dirtiness of sections of the region of the cache memory. The processing device may be configured to select the sections of the region of the cache memory based on a degree of dirtiness of data stored in the sections. Each section of the region of the cache memory may be tagged with a dirtiness indicator signifying the dirtiness of the data stored in the section. The degrees of dirtiness may be a binary degree of dirty or clean, or can include varying levels of dirtiness to indicate how much of the data stored in the section may need to be written back to another memory.

In block 1104, the processing device may order a flush of sections of the region of the cache memory from least dirty to most dirty. The less dirty the data stored in a section is, the less data that needs to be written back to another memory, the less amount of time is needed to flush the section, and the less amount of power is needed to flush the section. The amount of data needing to be written back to another memory, the amount of time needed to flush a section, and the amount of power needed to flush a section may increase the dirtier the data stored in a section is.

In various embodiments, the methods 900, 1000, and 1100 maybe be implemented separately or in any combination with each other or other techniques, algorithms, or heuristics for determining a section(s) of a region of a cache memory to flush.

Figure 12:
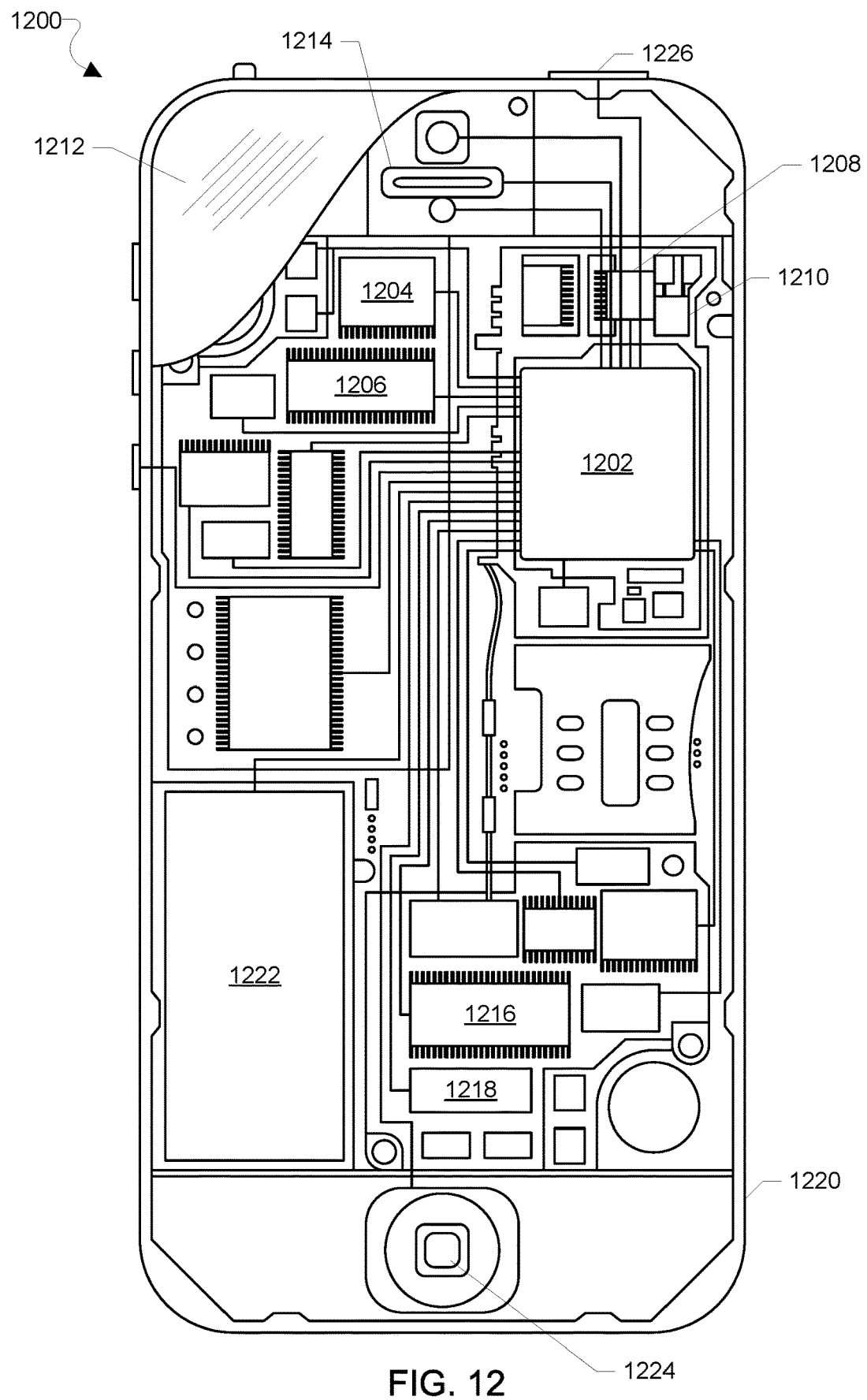
FIG. 12 is a component block diagram illustrating an example mobile computing device suitable for use with the various embodiments.

The various embodiments (including, but not limited to, embodiments described above with reference to FIGS. 1-11) may be implemented in a wide variety of computing systems including mobile computing devices, an example of which suitable for use with the various embodiments is illustrated in FIG. 12. The mobile computing device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components described herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
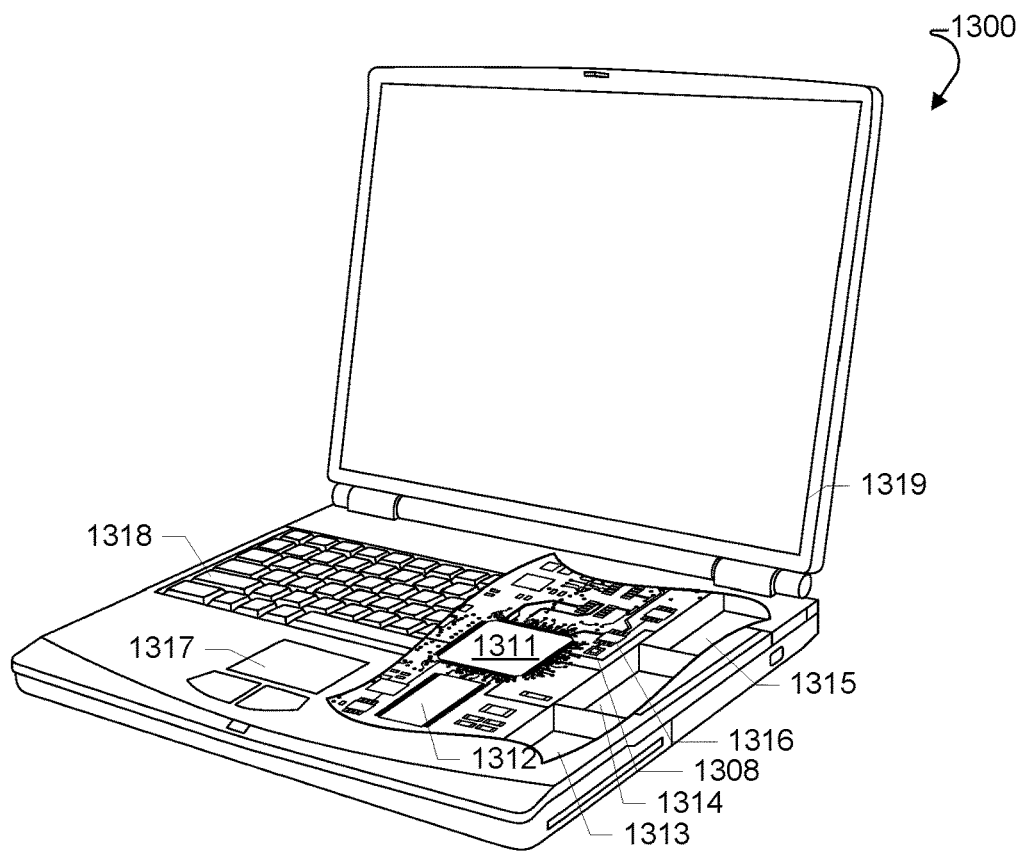
FIG. 13 is a component block diagram illustrating an example mobile computing device suitable for use with the various embodiments.

The various embodiments (including, but not limited to, embodiments described above with reference to FIGS. 1-11) may be implemented in a wide variety of computing systems include a laptop computer 1300 an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various embodiments.

Figure 14:
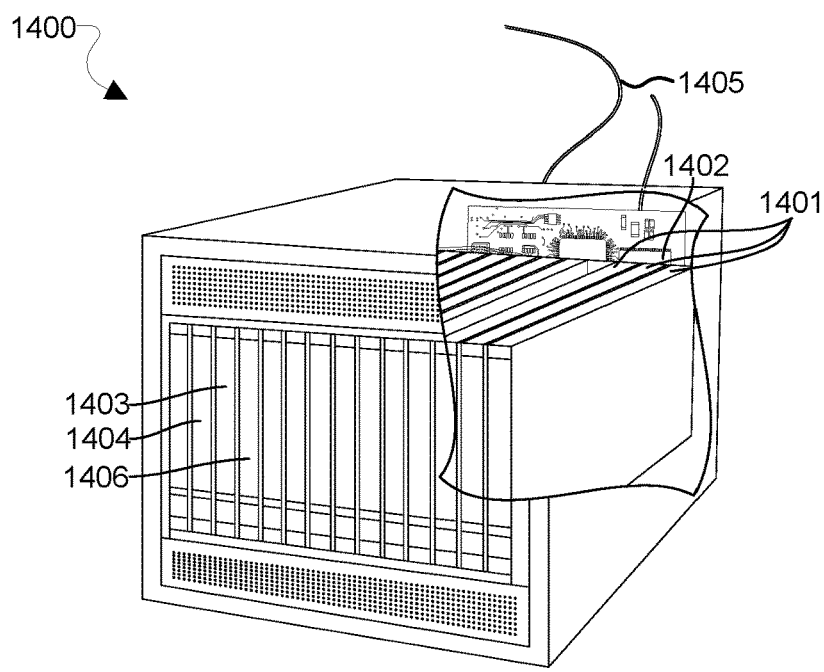
FIG. 14 is a component block diagram illustrating an example server suitable for use with the various embodiments.

The various embodiments (including, but not limited to, embodiments described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for conducting a progressive flush of a cache memory of a computing device, comprising:
   determining an activity state of a region of the cache memory;
   issuing a start cache memory flush command in response to determining that the activity state of the region is idle;
   flushing the region in response to the start cache memory flush command, wherein the region comprises a plurality of sections further comprising a current section of the plurality of sections that is undergoing flush;
   determining whether the activity state of the region is or is about to be active;
   issuing an abort cache memory flush command in response to determining that the activity state of the region is or is about to be active;
   determining whether flushing of the current section of the region is complete in response to the abort cache memory flush command;
   continuing to flush the current section of the region in response to determining that flushing of the current section of the region is not complete; and
   aborting flushing the region in response to determining that flushing of the current section of the region is complete.

2. The method of claim 1, further comprising receiving an indicator of an activity state of a client associated with the region,
   wherein determining an activity state of a region of the cache memory comprises determining the activity state of the region based on the activity state of the client.

3. The method of claim 1, further comprising receiving an indicator of an expected activity state of a client associated with the region including at least one of a time for a transition to the activity state of the client and a duration for the activity state of the client,
   wherein determining an activity state of a region of the cache memory comprises determining the activity state of the region based on the expected activity state of the client.

4. The method of claim 3, further comprising selecting the plurality of sections of the region to flush based on a number of sections that can be flushed within a threshold amount of time before the end of the duration for the activity state, and
   wherein flushing the region comprises flushing the plurality of sections sequentially.

5. The method of claim 1, further comprising determining a flushability status of a second section of the region,
   wherein flushing the region comprises flushing the second section based on the flushability status of the second section.

6. The method of claim 1, further comprising determining an order for flushing the plurality of sections of the region based on an amount of power saved by powering down each of the plurality of sections,
   wherein flushing the region comprises flushing the plurality of sections according to the order for flushing the plurality of sections.

7. The method of claim 1, further comprising determining an order for flushing the plurality of sections of the region based on a degree of dirtiness of data stored at each of the plurality of sections,
   wherein flushing the region comprises flushing the plurality of sections according to the order for flushing the plurality of sections.

8. A computing device, comprising:
a cache memory; and
a processing device communicatively connected to the cache memory and configured with processor-executable instructions to perform operations comprising:
   determining an activity state of a region of the cache memory;
   issuing a start cache memory flush command in response to determining that the activity state of the region is idle;
   flushing the region in response to the start cache memory flush command,
   wherein the region comprises a plurality of sections further comprising a current section of the plurality of sections that is undergoing flush;
   determining whether the activity state of the region is or is about to be active;
issuing an abort cache memory flush command in response to determining that the activity state of the region is or is about to be active;
   determining whether flushing of the current section of the region is complete in response to the abort cache memory flush command;
   continuing to flush the current section of the region in response to determining that flushing of the current section of the region is not complete; and
   aborting flushing the region in response to determining that flushing of the current section of the region is complete.

9. The computing device of claim 8, wherein the processing device is configured with processor-executable instructions to perform operations further comprising receiving an indicator of an activity state of a client associated with the region,
   wherein the processing device is configured with processor-executable instructions to perform operations such that determining an activity state of a region of the cache memory comprises determining the activity state of the region based on the activity state of the client.

10. The computing device of claim 8, wherein the processing device is configured with processor-executable instructions to perform operations further comprising receiving an indicator of an expected activity state of a client associated with the region including at least one of a time for a transition to the activity state of the client and a duration for the activity state of the client,
   wherein the processing device is configured with processor-executable instructions to perform operations such that determining an activity state of a region of the cache memory comprises determining the activity state of the region based on the expected activity state of the client.

11. The computing device of claim 10, wherein the processing device is configured with processor-executable instructions to perform operations further comprising selecting the plurality of sections of the region to flush based on a number of sections that can be flushed within a threshold amount of time before the end of the duration for the activity state, and
   wherein the processing device is configured with processor-executable instructions to perform operations such that flushing the region comprises flushing the plurality of sections sequentially.

12. The computing device of claim 8, wherein the processing device is configured with processor-executable instructions to perform operations further comprising determining a flushability status of a second section of the region,
   wherein the processing device is configured with processor-executable instructions to perform operations such that flushing the region comprises flushing the second section based on the flushability status of the second section.

13. The computing device of claim 8, wherein the processing device is configured with processor-executable instructions to perform operations further comprising determining an order for flushing the plurality of sections of the region based on an amount of power saved by powering down each of the plurality of sections,
   wherein the processing device is configured with processor-executable instructions to perform operations such that flushing the region comprises flushing the plurality of sections according to the order for flushing the plurality of sections.

14. The computing device of claim 8, wherein the processing device is configured with processor-executable instructions to perform operations further comprising determining an order for flushing the plurality of sections of the region based on a degree of dirtiness of data stored at each of the plurality of sections,
   wherein the processing device is configured with processor-executable instructions to perform operations such that flushing the region comprises flushing the plurality of sections according to the order for flushing the plurality of sections.

15. A computing device, comprising:
means for determining an activity state of a region of a cache memory;
means for issuing a start cache memory flush command in response to determining that the activity state of the region is idle;
means for flushing the region in response to the start cache memory flush command, wherein the region comprises a plurality of sections further comprising a current section of the plurality of sections that is undergoing flush;
means for determining whether the activity state of the region is or is about to be active;
means for issuing an abort cache memory flush command in response to determining that the activity state of the region is or is about to be active;
means for determining whether flushing of the current section of the region is complete in response to the abort cache memory flush command;
means for continuing to flush the current section of the region in response to determining that flushing of the current section of the region is not complete
means for aborting flushing the region in response to determining that flushing of the current section of the region is complete.

16. The computing device of claim 15, further comprising means for receiving an indicator of an activity state of a client associated with the region,
   wherein means for determining an activity state of a region of the cache memory comprises means for determining the activity state of the region based on the activity state of the client.

17. The computing device of claim 15, further comprising means for receiving an indicator of an expected activity state of a client associated with the region including at least one of a time for a transition to the activity state of the client and a duration for the activity state of the client,
   wherein means for determining an activity state of a region of the cache memory comprises means for determining the activity state of the region based on the expected activity state of the client.

18. The computing device of claim 17, further comprising means for selecting the plurality of sections of the region to flush based on a number of sections that can be flushed within a threshold amount of time before the end of the duration for the activity state, and an expected time for flushing the plurality of sections being approximately the same as the duration for the activity state,
wherein means for flushing the region comprises means for flushing the plurality of sections sequentially.

19. The computing device of claim 15, further comprising means for determining a flushability status of a second section of the region,
wherein means for flushing the region comprises means for flushing the second section based on the flushability status of the second section.

20. The computing device of claim 15, further comprising means for determining an order for flushing the plurality of sections of the region based on an amount of power saved by powering down each of the plurality of sections or means for determining an order for flushing a plurality of sections of the region based on a degree of dirtiness of data stored at each of the plurality of sections,
wherein means for flushing the region comprises means for flushing the plurality of sections according to the order for flushing the plurality of sections.

21. A non-transitory processor-readable storage medium having stored thereon processor-executable instructions configured to cause a processor of a computing device to perform operations comprising:
determining an activity state of a region of a cache memory;
issuing a start cache memory flush command in response to determining that the activity state of the region is idle;
flushing the region in response to the start cache memory flush command, wherein the region comprises a plurality of sections further comprising a current section of the plurality of sections that is undergoing flush;
determining whether the activity state of the region is or is about to be active;
issuing an abort cache memory flush command in response to determining that the activity state of the region is or is about to be active;
determining whether flushing of the current section of the region is complete in response to the abort cache memory flush command;
continuing to flush the current section of the region in response to determining that flushing of the current section of the region is not complete; and
aborting flushing the region in response to determining that flushing of the current section of the region is complete.

22. The non-transitory processor-readable storage medium of claim 21, wherein the stored processor-executable instructions are configured to cause the processor of the computing device to perform operations further comprising receiving an indicator of an activity state of a client associated with the region,
wherein the stored processor-executable instructions are configured to cause the processor of the computing device to perform operations such that determining an activity state of a region of the cache memory comprises determining the activity state of the region based on the activity state of the client.

23. The non-transitory processor-readable storage medium of claim 21, wherein the stored processor-executable instructions are configured to cause the processor of the computing device to perform operations further comprising receiving an indicator of an expected activity state of a client associated with the region including at least one of a time for a transition to the activity state of the client and a duration for the activity state of the client,
wherein the stored processor-executable instructions are configured to cause the processor of the computing device to perform operations such that determining an activity state of a region of the cache memory comprises determining the activity state of the region based on the expected activity state of the client.

24. The non-transitory processor-readable storage medium of claim 23, wherein the stored processor-executable instructions are configured to cause the processor of the computing device to perform operations further comprising selecting the plurality of sections of the region to flush based on a number of sections that can be flushed within a threshold amount of time before the end of the duration for the activity state, and,
wherein the stored processor-executable instructions are configured to cause the processor of the computing device to perform operations such that flushing the region comprises flushing the plurality of sections sequentially.

25. The non-transitory processor-readable storage medium of claim 21, wherein the stored processor-executable instructions are configured to cause the processor of the computing device to perform operations further comprising determining a flushability status of a second section of the region,
wherein the stored processor-executable instructions are configured to cause the processor of the computing device to perform operations such that flushing the region comprises flushing the second section based on the flushability status of the second section.

26. The non-transitory processor-readable storage medium of claim 21, wherein the stored processor-executable instructions are configured to cause the processor of the computing device to perform operations further comprising determining an order for flushing the plurality of sections of the region based on an amount of power saved by powering down each of the plurality of sections or based on a degree of dirtiness of data stored at each of the plurality of sections,
wherein the stored processor-executable instructions are configured to cause the processor of the computing device to perform operations such that flushing the region comprises flushing the plurality of sections according to the order for flushing the plurality of sections.

* * * * *